US009030676B2

United States Patent
Murakami et al.

(10) Patent No.: US 9,030,676 B2
(45) Date of Patent: May 12, 2015

(54) SPATIAL INFORMATION DETECTION DEVICE

(75) Inventors: Kenichi Murakami, Osaka (JP); Yusuke Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/985,935

(22) PCT Filed: Feb. 21, 2012

(86) PCT No.: PCT/JP2012/054064
§ 371 (c)(1),
(2), (4) Date: Aug. 16, 2013

(87) PCT Pub. No.: WO2012/115083
PCT Pub. Date: Aug. 30, 2012

(65) Prior Publication Data
US 2013/0329234 A1    Dec. 12, 2013

(30) Foreign Application Priority Data
Feb. 21, 2011    (JP) .................................. 2011-035030

(51) Int. Cl.
*G01S 17/32*    (2006.01)
*G01B 11/02*    (2006.01)
(Continued)

(52) U.S. Cl.
CPC ............... *G01B 11/02* (2013.01); *G01S 7/4912* (2013.01); *G01S 17/32* (2013.01); *G01S 17/89* (2013.01); *G01S 7/4915* (2013.01)

(58) Field of Classification Search
CPC .................. G01S 17/89; G01S 17/32
USPC ........ 356/3, 4.01, 4.07, 625, 634; 250/559.19
See application file for complete search history.

(56) References Cited

U.S. PATENT DOCUMENTS

| 8,699,008 | B2* | 4/2014 | Murakami et al. ............ 356/4.01 |
| 2003/0223053 | A1 | 12/2003 | Liu et al. |
| 2012/0050716 | A1* | 3/2012 | Murakami et al. ............ 356/4.01 |

FOREIGN PATENT DOCUMENTS

| DE | 19704496 A1 | 3/1998 |
| EP | 1 612 511 A1 | 1/2006 |

(Continued)

OTHER PUBLICATIONS

International Search Report for corresponding International Application No. PCT/JP2012/054064 mailed Mar. 19, 2012.
(Continued)

*Primary Examiner* — Roy M Punnoose
(74) *Attorney, Agent, or Firm* — Renner, Otto, Boisselle & Sklar, LLP

(57) ABSTRACT

The spatial information detection device emits, to a space including an intended area, signal light defined as light modulated with a modulation signal defined as a square wave signal having high and low level periods appearing alternately, each of the periods having its length randomly selected from integral multiples of a unit time period. The device generates signal electric charges by accumulating electric charges generated in response to light from the space in a collection time period determined by a demodulation signal defined as a signal having the same waveform as that of the modulation signal or that of the inverted modulation signal. The device corrects, using correction information regarding an effect caused by light from an unintended area, the amount of signal electric charges as an amount of intended electric charges produced in response to light from the intended area, thereby generating spatial information.

9 Claims, 8 Drawing Sheets

(51) Int. Cl.
  *G01S 7/491* (2006.01)
  *G01S 17/89* (2006.01)

(56) References Cited

FOREIGN PATENT DOCUMENTS

| EP | 2 116 864 A1 | 11/2009 |
| JP | 2004-045304 A | 2/2004 |
| JP | 2006-121617 A | 5/2006 |
| JP | 2011-022088 A | 2/2011 |
| JP | 2011-022089 A | 2/2011 |
| WO | WO 2010/098454 A1 | 9/2010 |

OTHER PUBLICATIONS

Form PCT/ISA/237 for corresponding International Application No. PCT/JP2012/054064 dated Mar. 19, 2012.

Büttgen et al., "Robust Optical Time-of-Flight Range Imaging Based on Smart Pixel Structures", IEEE Transactions on Circuits and Systems-I: Regular Papers, vol. 55, No. 6, Jul. 2008, pp. 1512-1525.

* cited by examiner

SPATIAL INFORMATION DETECTION DEVICE

TECHNICAL FIELD

The present invention relates to spatial information detection devices and particularly to an active type spatial information detection device which emits light to a space to be detected and receives light from the space in order to detect spatial information such as a distance to an object present in this space, a reflectance or an absorbance of an object present in this space, a reflectance or an absorbance of a medium in this space, and presence or absence of an object in this space.

BACKGROUND ART

In the past, there have been proposed active type spatial information detection devices configured to detect spatial information by means of emitting light to a space to be searched and receiving light from the space. These kinds of spatial information detection devices detect the spatial information such as a distance to an object present in a space, a reflectance or an absorbance of an object present in a space, a reflectance or an absorbance of a medium in a space, and presence or absence of an object in a space. These spatial information detection devices are designed depending on types of the spatial information to be detected.

Known as the spatial information detection device detecting a distance to an object present in a space as the spatial information is a device using the time of flight measurement to measure time starting from time of emitting light and ending on time of receiving the light reflected by the object. The measured time is converted to the distance to the object.

For example, this kind of the spatial information detection device emits intensity-modulated light (hereinafter referred to as "signal light") having an intensity oscillating at a constant period such as a sine wave, and measures a phase difference between a waveform of the intensity-modulated light at emitted time and a waveform of the intensity-modulated light at received time. Since the period of the waveform of the intensity-modulated light is constant, a distance to an object can be calculated on the basis of the measured phase difference (see e.g., document 1 [JP 2004-45304 A]).

For example, amounts of electric charges corresponding to amounts of received light are acquired at a plurality of timings synchronized with the signal light, and the phase difference is calculated by use of a relation between the amounts of the electric charges at the plurality of timings. Since this phase difference is corresponding to a time difference between time of emitting the signal light and time of receiving light reflected by the object, the time difference r between the time of emitting light and time of receiving the light is expressed by an equation of $r=T(\Psi/2\pi)$, wherein T [s] denotes a period of the signal light and c [m/s] denotes the light speed and $\Psi$ [radian] denotes a phase difference between the waveforms of the intensity-modulated light. Further, a distance L to the object can be calculated by use of an equation of $L=(1/2)c*r=(1/2)c*T(\Psi/2\pi)$. For example, when the signal light has a frequency of 20 MHz, the period T is 50 [ns]. Hence, a measurable maximum distance (hereinafter referred to as "maximum measuring distance") is 7.5 [m]. In summary, since the signal light having an intensity oscillating at a constant period is used, an upper limit of a measurable range is equal to a distance corresponding to a half period of the signal light (distance corresponding to a half wavelength).

Further, a device designed to provide a light projection period in which the signal light is emitted to the space and a non-light projection period in which no signal light is emitted to the space is known as the spatial information detection device detecting the spatial information such as a reflectance or an absorbance of an object present in a space, a reflectance or an absorbance of a medium in a space, and presence or absence of an object in a space. According to this device, an effect caused by environmental light and surrounding light (hereinafter referred to collectively as "environmental light") is eliminated by use of a difference between the amounts of the received light respectively related to the light projection period and the non-light projection period, and detects only a component of reflection light derived from the signal light emitted to the space (see e.g., document 2 [JP 2006-121617 A]).

The amount of the received light in the non-light projection period is equal to the amount of the received light corresponding to only the environmental light but the amount of the received light in the light projection period is equal to the amount of the received light corresponding to the emitted signal light and the environmental light. Hence, the spatial information detection device eliminates a component corresponding to the environmental light with reference to the amount of the received light in the light projection period and the amount of the received light in the non-light projection period, and extracts a component corresponding to the reflection light derived from the signal light. In other words, the spatial information corresponding to the intensity of the reflection light derived from the signal light is detected.

In aforementioned documents 1 and 2, to receive light from the space, an imaging element is used. To calculate the distance, a distance image having pixel values defined by distance values is generated. To calculate the intensity of the reflection light, a grayscale image having pixel values defined by intensity values is generated.

As described above, according to the techniques disclosed in aforementioned documents 1 and 2, the spatial information is detected based on the reflection light derived from the signal light emitted to the space. Therefore, when a transparent object (e.g., glass) allowing light to pass is present between the spatial information detection device and the space to be searched for the spatial information, reflection light from the transparent object may be received in addition to light from the space to be searched for the spatial information. In this case, the reflection light from the transparent object is likely to be added to the light from the space. Thus, the amount of the received light may contain some components different from the component relating to the space. Therefore, there arises a problem that accurate detection of the spatial information may be prevented.

Further, even when not the transparent object but an object exists in a vicinity of the spatial information detection device, reflection light (mainly, diffuse reflection light) caused by the object may come into the spatial information detection device, and such reflection light may be added to the light from the space. In this case, the accurate detection of the spatial information may be prevented. In the above case, the vicinity of the spatial information detection device means a region between the spatial information detection device and the space to be searched for the spatial information.

As described above, when an object (hereinafter referred to as "unintended object") which is not selected as a target for detecting the spatial information is present between the spatial information detection device and the space, reflection light from the unintended object is added to light from the space and comes into the spatial information detection device. Consequently, there arises a problem that the spatial information detection device may fail to detect the spatial information accurately.

SUMMARY OF INVENTION

In view of the above insufficiency, the present invention has aimed to propose a spatial information detection device capable of reducing the effect caused by the unintended object to improve the detection accuracy of the spatial information even if the unintended object is present between the spatial information detection device and the space selected as a target for detecting the spatial information.

The spatial information detection device of the first aspect in accordance with the present invention includes: a light projecting unit configured to emit signal light to a space including a predetermined intended area; a light receiving unit configured to receive light from the space; a modulation signal generation unit configured to generate a modulation signal and provide the modulation signal to the light projecting unit; a demodulation signal generation unit configured to generate a demodulation signal and provide the demodulation signal to the light receiving unit; a calculation unit configured to generate spatial information regarding the intended area; and a correction information provision unit. The modulation signal is defined as a square wave signal having high and low level periods appearing alternately, each of the high and low level periods having its length randomly selected from integral multiples of a predetermined unit time period. The light projecting unit is configured to, upon receiving the modulation signal, modulate light with the received modulation signal to generate the signal light. The demodulation signal is defined as a signal which has the same waveform as that of the modulation signal or that of a signal obtained by inversion of the modulation signal. The light receiving unit is configured to produce an amount of electric charges corresponding to an intensity of light received from the space within a collection time period defined by one of a first period in which the demodulation signal has a high level and a second period in which the demodulation signal has a low level, and accumulate the electric charges produced within the collection time period over a predetermined accumulation time period longer than the collection time period to generate signal electric charges. The correction information provision unit is configured to generate correction information regarding electric charges which the light receiving unit produces in response to light from an unintended area existing between the intended area and a set of the light projecting unit and the light receiving unit. The calculation unit is configured to correct by use of the correction information the amount of the signal electric charges as an amount of intended electric charges corresponding to the electric charges which the light receiving unit produces in response to light from the intended area, and generate the spatial information based on the amount of the intended electric charges.

With regard to the spatial information detection device of the second aspect in accordance with the present invention, in addition to the first aspect, the spatial information detection device further comprises a search signal generation unit configured to generate a search signal and provide the search signal to the light receiving unit. The search signal is defined as a signal having a predetermined time difference relative to the modulation signal. The correction information provision unit includes a phase shift unit and a correction information calculation unit. The light receiving unit is configured to produce an amount of electric charges corresponding to an intensity of light received from the space within a second collection time period defined by one of a first period in which the search signal has a high level and a second period in which the search signal has a low level, and accumulate the electric charges produced within the second collection time period over a predetermined second accumulation time period longer than the second collection time period to generate correction electric charges. The phase shift unit is configured to vary the time difference by a variation width shorter than the unit time period within a predetermined time range in order to allow the search signal generation unit to generate the plurality of search signals with different time differences. The correction information calculation unit is configured to obtain the correction electric charges from the light receiving unit with regard to each of the search signals with the different time differences, and generate the correction information based on a relation between the time difference and an amount of the correction electric charges.

With regard to the spatial information detection device of the third aspect in accordance with the present invention, in addition to the second aspect, the spatial information is defined as a distance to an intended object present in the intended area. The calculation unit is configured to calculate, from the amount of the intended electric charges, flight time starting from time when the light projecting unit emits the signal light and ending on time when the light receiving unit receives the light reflected by the intended object, and determine the distance based on the calculated flight time. The correction information includes an unintended component and unintended flight time. The unintended component is defined as an amount of unintended electric charges corresponding to electric charges which the light receiving unit produces in response to light from the unintended area. The unintended flight time is defined as time starting from time when the light projecting unit emits the signal light and ending on time when the light receiving unit receives the light reflected by an unintended object present in the unintended area. The correction information calculation unit is configured to calculate a change rate of the amount of the correction electric charges to the time difference. The correction information calculation unit is configured to calculate, as the unintended component, a product of the unit time period and the change rate within a range in which the amount of the correction electric charges changes linearly with time difference. The correction information calculation unit is configured to select, as the unintended flight time, the time difference at which the change rate becomes 0. The calculation unit is configured to preliminarily store a conversion formula of the amount of the signal electric charges to the amount of the intended electric charges by use of the unintended component and the unintended flight time. The calculation unit is configured to correct the amount of the signal electric charges as the amount of the intended electric charges by use of the unintended component and the unintended flight time obtained from the correction information provision unit and the conversion formula.

With regard to the spatial information detection device of the fourth aspect in accordance with the present invention, in addition to the third aspect, the demodulation signal generation unit is configured to generate the plurality of demodulation signals. The plurality of demodulation signals include two of a first demodulation signal having the same waveform as that of the modulation signal, a second demodulation signal defined as a signal obtained by inversion of the first demodulation signal, a third demodulation signal delayed from the first demodulation signal by the unit time period, and a fourth demodulation signal defined as a signal obtained by inversion of the third demodulation signal.

With regard to the spatial information detection device of the fifth aspect in accordance with the present invention, in addition to the second aspect, the spatial information is defined as a reflection intensity of the signal light in the intended area. The correction information includes an unintended component. The unintended component is defined as an amount of unintended electric charges corresponding to electric charges which the light receiving unit produces in response to light from the unintended area. The correction information calculation unit is configured to calculate a change rate of the amount of the correction electric charges to the time difference. The correction information calculation unit is configured to calculate, as the unintended component, a product of the unit time period and the change rate within a range in which the amount of the correction electric charges changes linearly with the time difference. The calculation unit is configured to preliminarily store a conversion formula of the amount of the signal electric charges to the amount of the intended electric charges by use of the unintended component. The calculation unit is configured to correct the amount of the signal electric charges as the amount of the intended electric charges by use of the unintended component obtained from the correction information provision unit and the conversion formula.

With regard to the spatial information detection device of the sixth aspect in accordance with the present invention, in addition to the fifth aspect, the light projecting unit is configured to emit the signal light within a light projection period and not emit the signal light within a non-light projection period. The calculation unit is configured to calculate the reflection intensity based on the amount of the intended electric charges associated with the light projection period and the amount of the intended electric charges associated with the non-light projection period.

With regard to the spatial information detection device of the seventh aspect in accordance with the present invention, in addition to any one of the second to sixth aspects, the correction information provision unit includes a range setting unit configured to designate an effective range of the time difference within which the correction electric charges which do not contain the intended electric charges from the light receiving unit are obtained. The correction information calculation unit is configured to generate the correction information based on a relation between the time difference within the effective range designated by the range setting unit and the amount of the correction electric charges.

With regard to the spatial information detection device of the eighth aspect in accordance with the present invention, in addition to the seventh aspect, the correction information provision unit includes a correction information acquisition unit configured to decide the effective range based on the relation between the time difference within the predetermined time range and the amount of the correction electric charges. The range setting unit is configured to designate the effective range decided by the correction information acquisition unit.

With regard to the spatial information detection device of the ninth aspect in accordance with the present invention, in addition to any one of the first to eighth aspects, the correction information provision unit is configured to judge whether a predetermined update condition is fulfilled, and to, upon concluding that the update condition is fulfilled, update the correction information.

DESCRIPTION OF EMBODIMENTS

In the embodiments described below, a spatial information detection device is exemplified by: a distance measurement device which measures a distance to an object present in a space selected as an object to be searched; and an intensity measurement device which measures an intensity of light reflected by an object present in a space selected as an object to be searched. In an instance where such a distance is measured by use of an imaging device serving as a light receiving unit for receiving light from a space, a distance image having distance values as pixel values is generated. In an instance where such an intensity of light reflected is measured by use of an imaging device serving as a light receiving unit for receiving light from a space, a grayscale image having gray values as pixel values is generated. Note that, a configuration in which measurement of a distance or an intensity of reflected light is carried out by use of a light receiving unit constituted by a light receiving element including a single light receiving region (photoelectric converter) may be available. The following explanations are made to basic configurations of the distance measurement device and the intensity measurement device.

(Distance Measurement Device)

Figure 1:
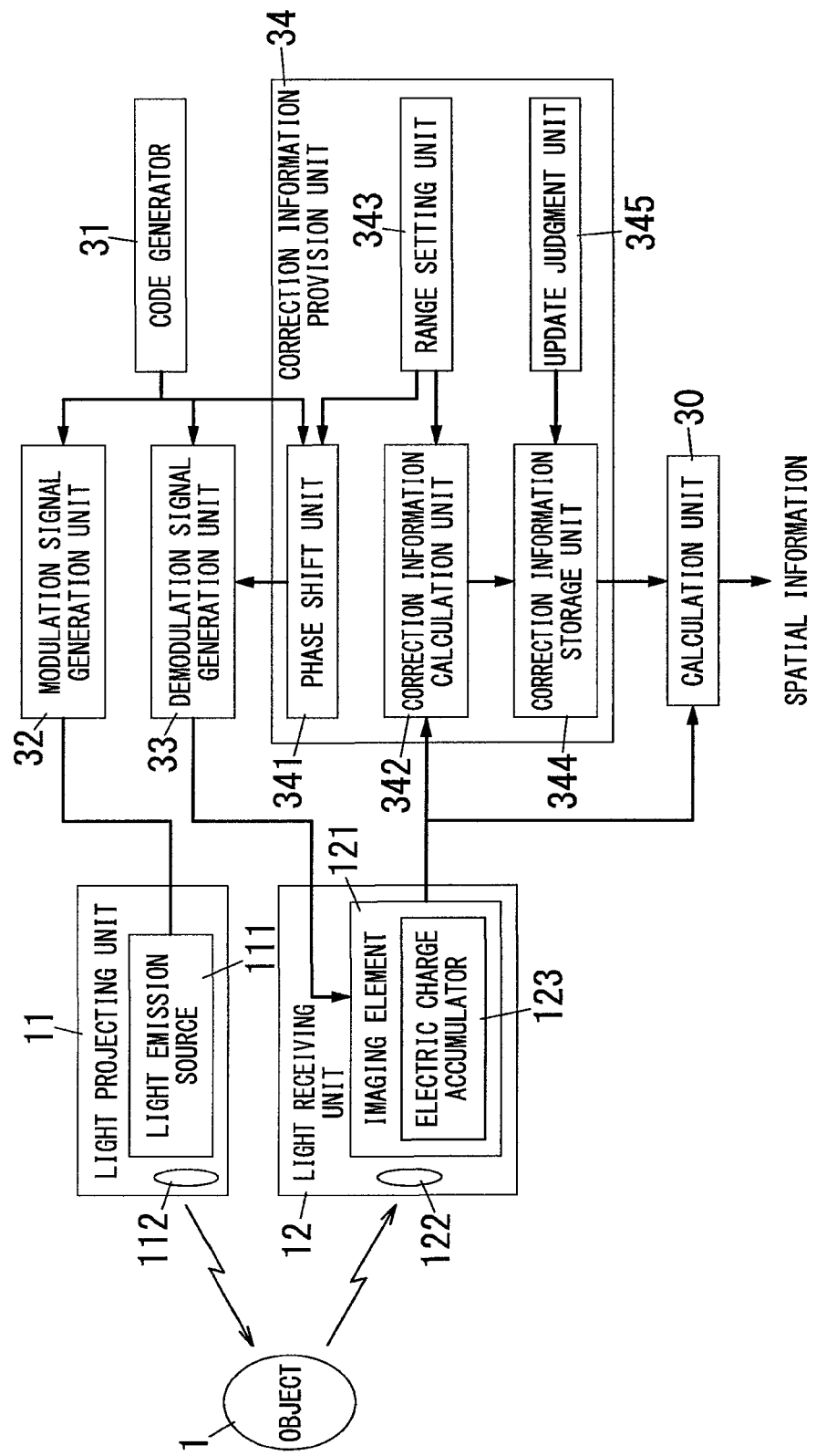
FIG. 1 is a block diagram illustrating the spatial information detection device of the first embodiment.
Figure 2:
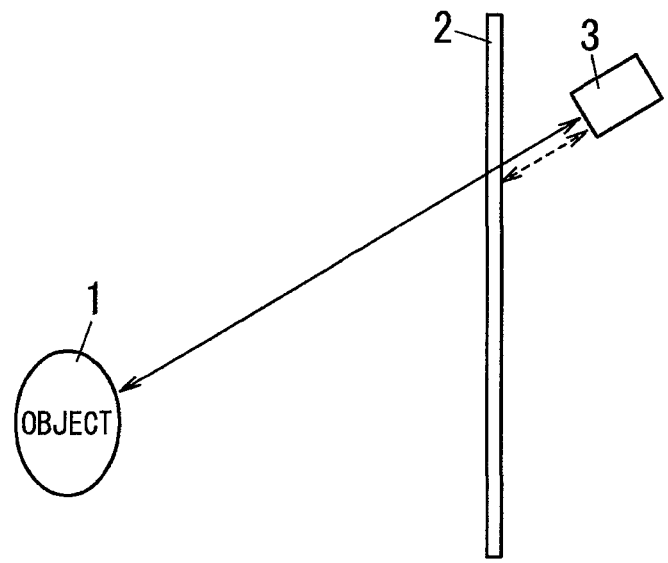
FIG. 2 is a side view illustrating how to use the spatial information detection device of the above first embodiment.

As shown in FIG. 1, the distance measurement device includes a light projecting unit 11 configured to emit light to a space selected to be searched, and a light receiving unit 12 configured to receive light from the space. When an object (intended object) 1 is present in the space, light (hereinafter referred to as "signal light") emitted from the light projecting unit 11 is reflected by the object 1, and reflection light from the object 1 strikes the light receiving unit 12. Hence, with measuring a physical amount corresponding to time (flight time) starting from time when the light projecting unit 11 emits the signal light and ending on time when the light receiving unit 12 receives the reflected signal light, a distance to the object 1 can be determined. In brief, the distance measurement device shown measures a distance based on the time of flight measurement.

The light projecting unit 11 is configured to emit signal light to a space including a predetermined intended area. The intended area is, for example, a space in which the object 1 exists. The light projecting unit 11 includes: a light emission source 111 which is a light emitting element such as a light emitting diode and a laser diode; and a light projecting optical system 112 designed to adjust a light projecting range of the signal light emitted from the light emission source 111.

The light receiving unit 12 is configured to receive light from the space. The light receiving unit 12 includes an imaging element 121 and a light receiving optical system 122. The imaging element 121 is, for example, a CCD area image sensor and a CMOS area image sensor. The light receiving optical system 122 is designed to adjust a field of view of the imaging element 121.

The light emission element used in the light emission source 111 enables modulation of a light output at high frequency (e.g., 10 MHz). The imaging element 121 senses an intensity variation of the received light observed within a short time period substantially same as a time period within which a variation of the light output of the light emitted from the light emission source 111. The light emission source 111 may include a single light emitting element but preferably may include a combination of a plurality of light emitting elements to increase the light output so as to allow the signal light to reach a far place. The light projecting optical system 112 and the light receiving optical system 122 are constituted by lenses normally, but may be constituted by mirrors or combinations of lenses and mirrors.

In the imaging element 121, a collection time period for collecting electric charges caused by photoelectric conversion is determined by use of an electric shutter. Accumulation of electric charges is carried out by repeating multiple times (e.g., 10000 times) collection of electric charges for each light receiving region (photoelectric converter) performing photoelectric conversion. Hereinafter, a time period for accumulating electric charges is referred to as "accumulation time period". The accumulation time period is defined as a short time period in which the intensity of the received light is considered to be constant. The imaging element 121 functions as not only the light receiving unit 12 configured to generate an amount of electric charges corresponding to the intensity of the received light but also an electric charge accumulator 123 configured to accumulate the electric charges generated by the light receiving unit 12 in the designated collection time period over the predetermined accumulation time period enough longer than the collection time period. Note that, in a case where not an imaging device but a light receiving element including a photo diode having a single light receiving region is used as the light receiving unit 12, normally, an electric charge accumulator is provided in addition to the light receiving element.

As mentioned above, the light receiving unit 12 includes the photoelectric converter and the electric charge accumulator 123. The photoelectric converter is configured to produce an amount of electric charges corresponding to an intensity of light received from the space within the collection time period defined by a period in which a demodulation signal has a high level. The electric charge accumulator 123 is configured to accumulate the electric charges produced within the collection time period over the predetermined accumulation time period longer than the collection time period and provide the accumulated electric charges as signal electric charges to a calculation unit 30.

Alternatively, the collection time period may be defined by a period in which the demodulation signal has a low level. In brief, the light receiving unit 12 is configured to produce an amount of electric charges corresponding to an intensity of light received from the space within the collection time period defined by one of a first period in which the demodulation signal has a high level and a second period in which the demodulation signal has a low level.

When the imaging element 121 is a CCD image sensor of an FT type, the light receiving region (photoelectric converter) is corresponding to a pixel of an imaging region, and the electric charge accumulator 123 is corresponding to an accumulation region. Further, with respect to a CCD image sensor of an IT type, the light receiving region is corresponding to a pixel of an imaging region, and the electric charge accumulator 123 is corresponding to a vertical transfer unit. Note that, a transfer unit provided to the imaging element 121 functions as an electric charge ejector designed to eject electric charges.

With accumulating electric charges produced depending on the intensity of the received light in the aforementioned manner, it is possible to increase the amount of the electric charges for each light receiving region. Therefore, a signal level can be enhanced and an effect caused by a shot noise can be reduced. In a case where the light output of the light emission source 111 is modulated at a frequency of about 10 MHz, the number of times for ejecting the electric charges from the imaging element 121 can be 30 times per second or more, even if the number of accumulation is about 10000. In other words, a smooth dynamic image can be generated by use of the distance images having distance values as pixel values.

Besides, a distance to the object 1 is calculated based on a relation between a signal pattern (signal waveform) of a modulation signal for modulating the intensity of the signal light emitted from the light emission source 111 and the collection time period at the imaging element 121 corresponding to this signal pattern.

Figure 4:
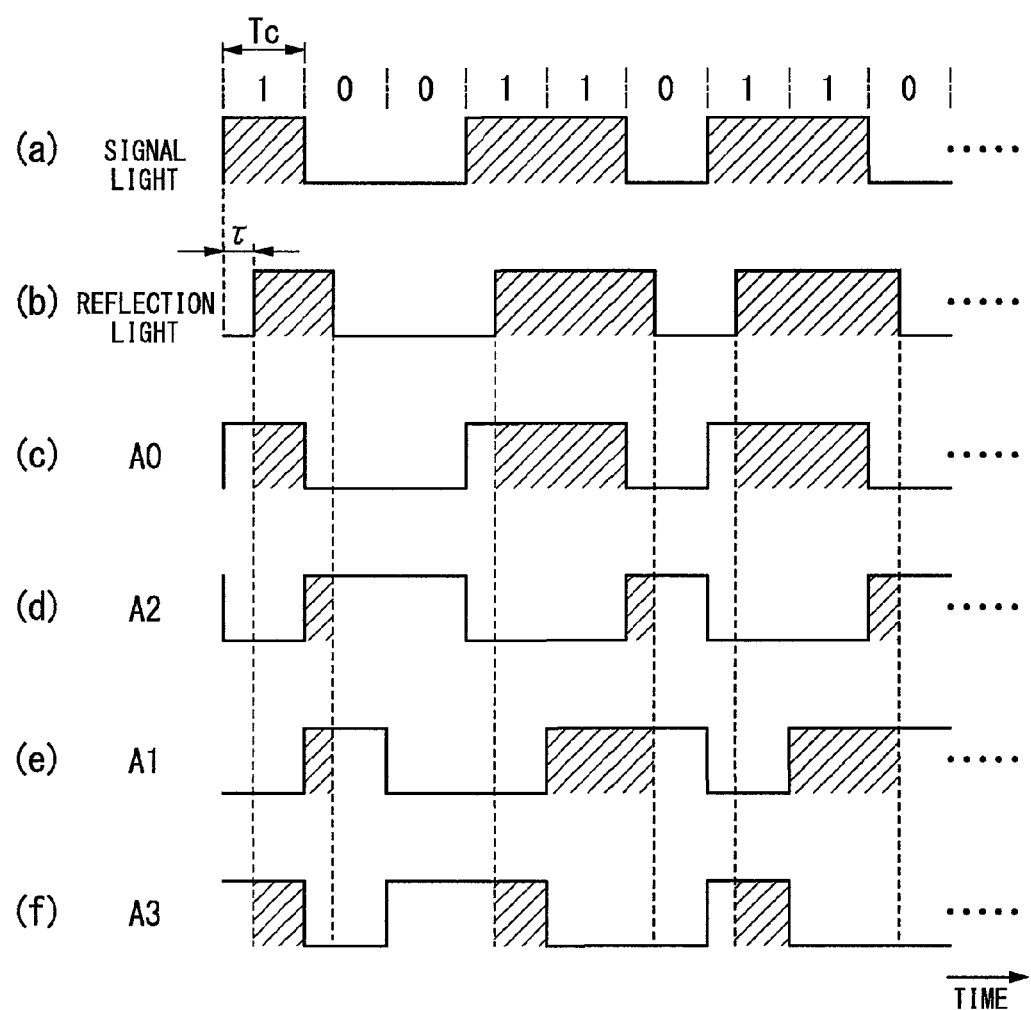
FIG. 4 is an explanatory diagram illustrating an operation of the spatial information detection device of the above first embodiment.

As shown in FIG. 4 (a), the modulation signal is a square wave signal which has continuous periods for each of two signal values of an H level (high level) and an L level (low level) are randomly changed. The modulation signal becomes the H level or L level irregularly. The probability that the modulation signal is the H level is equivalent to the probability that the modulation signal is the L level. In brief, the modulation signal is defined as a square wave signal having high and low level periods appearing alternately, each of the high and low level periods having its length randomly selected from integral multiples of a predetermined unit time period. In FIG. 4, the signal value of "1" indicates that the modulation signal is the H level, and the signal value of "0" indicates that the modulation signal is the L level.

Such a modulation signal is derived from a reference signal which is created by using a technique (e.g., a gold code generator) for creating a PN (Pseudorandom Noise) code used in spread spectrum techniques. The reference signal is created in a similar manner as the PN code such that each of H and L level periods has its length selected from integral multiples of a predetermined unit time period. In the following, in conformity with the PN code, the unit time period is referred to as "chip duration". For example, the chip duration is 100 [ns], but is not limited thereto.

To generate the reference signal, a code generator 31 is provided. The reference signal provided from the code generator 31 is inputted into a modulation signal generation unit 32. The modulation signal generation unit 32 generates the modulation signal from the reference signal. The modulation signal generated by the modulation signal generation unit 32 is supplied to the light emission source 111. The light emission source 111 is turned on while the modulation signal has the H level and the light emission source 111 is turned off while the modulation signal has the L level. The light emission source 111 is turned on and off in accordance with the signal value of the modulation signal, thereby emitting the signal light having the intensity varying in a rectangular wave manner, to the space.

The reference signal outputted from the code generator 31 is also inputted in to a demodulation signal generation unit 33. The demodulation signal generation unit 33 generates the demodulation signal designating the collection time period in which each light receiving unit 12 of the imaging element 121 collects electric charges. The demodulation signal generation unit 33 is configured to generate the demodulation signal and provide the generated demodulation signal to the light receiving unit 12. The demodulation signal is defined as a signal which has the same waveform as that of the modulation signal or that of a signal obtained by inversion of the modulation signal.

The demodulation signal generation unit 33 of the present embodiment generates the four different demodulation signals in order to generate a single distance image. A timing signal is generated by a timing signal generation unit (not shown) which is different from the code generator 31. The timing signal is used for determining timing at which the electric charges accumulated by the imaging element 121 are ejected outside and operation timings of the calculation unit 30 mentioned below. The calculation unit 30 includes a microcomputer as a main component, and executes appropriate programs by the microcomputer to implement functions of the calculation unit 30 described below.

The following explanation is made to a case where the modulation signal outputted from the modulation signal generation unit 32 has the same phase as the reference signal generated by the code generator 31. Note that, the reference signal generated by the code generator 31 may be used as one of the demodulation signals and the modulation signal may have a phase shifted from that of the reference signal.

FIG. 4 shows relations between the modulation signal and the respective demodulation signals. FIG. 4 (a) shows the modulation signal (the intensity of the signal light), and FIG. 4 (b) shows the intensity of light received by the imaging element 121. As shown in FIG. 4 (c) to (f), the demodulation signals are generated to satisfy the following relations with regard to the modulation signal.

Two of the four kinds of the demodulation signals are a first demodulation signal defined as a non-inverted signal identical to the modulation signal as shown in FIG. 4 (c) and a second demodulation signal defined as a signal obtained by inversion of the modulation signal with respect to the H and L levels as shown in FIG. 4 (d). The remaining two kinds of the demodulation signals are a third demodulation signal defined as a signal delayed from the non-inverted signal identical to the modulation signal by single chip duration Tc as shown in FIG. 4 (e) and a fourth demodulation signal defined as a signal obtained by the steps of delaying the modulation signal by the single chip duration Tc and inverting the delayed modulation signal with respect to the H and L levels. In other words, each demodulation signal is generated to have a prescribed relation with the modulation signal. As mentioned above, the demodulation signal generation unit 33 is configured to generate the plurality of (four) demodulation signals. The plurality of demodulation signals include the first demodulation signal having the same waveform as that of the modulation signal, the second demodulation signal defined as a signal obtained by inversion of the first demodulation signal, the third demodulation signal delayed from the first demodulation signal by the unit time period (single chip duration) Tc, and the fourth demodulation signal defined as a signal obtained by inversion of the third demodulation signal.

The time (flight time) starting from the time when the light emission source 111 projects light and ending on the time when the imaging element 121 receives the light reflected by the object 1 is varied depending on the distance to the object 1. Therefore, the intensity of the received light is varied as shown in FIG. 4 (b). Hence, when the collection time period for the imaging element 121 is designated by any one of the aforementioned four kinds of the demodulation signals, an amount of electric charges collected by the imaging element 121 in response to the signal light is corresponding to an area designated by a hatching in corresponding one of FIG. 4 (c) to (f).

With designating the collection time period for the imaging element 121 by one of the four kinds of the demodulation signals in turn and ejecting the electric charges from the imaging element 121 for each collection time period, an amount of the electric charges can be obtained for each of the collection time periods respectively designated by the four kinds of the demodulation signals. In the following explanation, the amounts of the electric charges obtained corresponding to the respective demodulation signals are designated by A0, A2, A1, and A3.

In other words, A0 denotes the amount of the electric charges (the amount of the signal electric charges associated with the first demodulation signal) obtained by accumulating for the accumulation time period the electric charges collected in the collection time period designated by the demodulation signal (first demodulation signal) identical to the modulation signal as shown in FIG. 4 (c). Further, A2 denotes the amount of the electric charges (the amount of the signal electric charges associated with the second demodulation signal) obtained by accumulating for the accumulation time period the electric charges collected in the collection time period designated by the demodulation signal (second demodulation signal) obtained by inversion of the first demodulation signal as shown in FIG. 4 (d). Similarly, A1 denotes the amount of the electric charges (the amount of the signal electric charges associated with the third demodulation signal) obtained by accumulating for the accumulation time period the electric charges collected in the collection time period designated by the demodulation signal (third demodulation signal) shifted from the modulation signal by one chip duration Tc as shown in FIG. 4 (e). Additionally, A3 denotes the amount of the electric charges (the amount of the signal electric charges associated with the fourth demodulation signal) obtained by accumulating for the accumulation time period the electric charges collected in the collection time period designated by the demodulation signal (fourth demodulation signal) obtained by inversion of the third demodulation signal as shown in FIG. 4 (f).

As mentioned above, in the imaging element 121, the electric charges are ejected after collection of the electric charges is repeated multiple times (after the electric charges are accumulated over a multiple of the chip duration Tc). Therefore, the amounts of the electric charges ejected from the imaging element 121 converge on a value expressed by a linear function of the time difference between the time of projecting light and the time of receiving light (i.e., the flight time) $\tau$ owing to randomness of the modulation signal.

Figure 5:
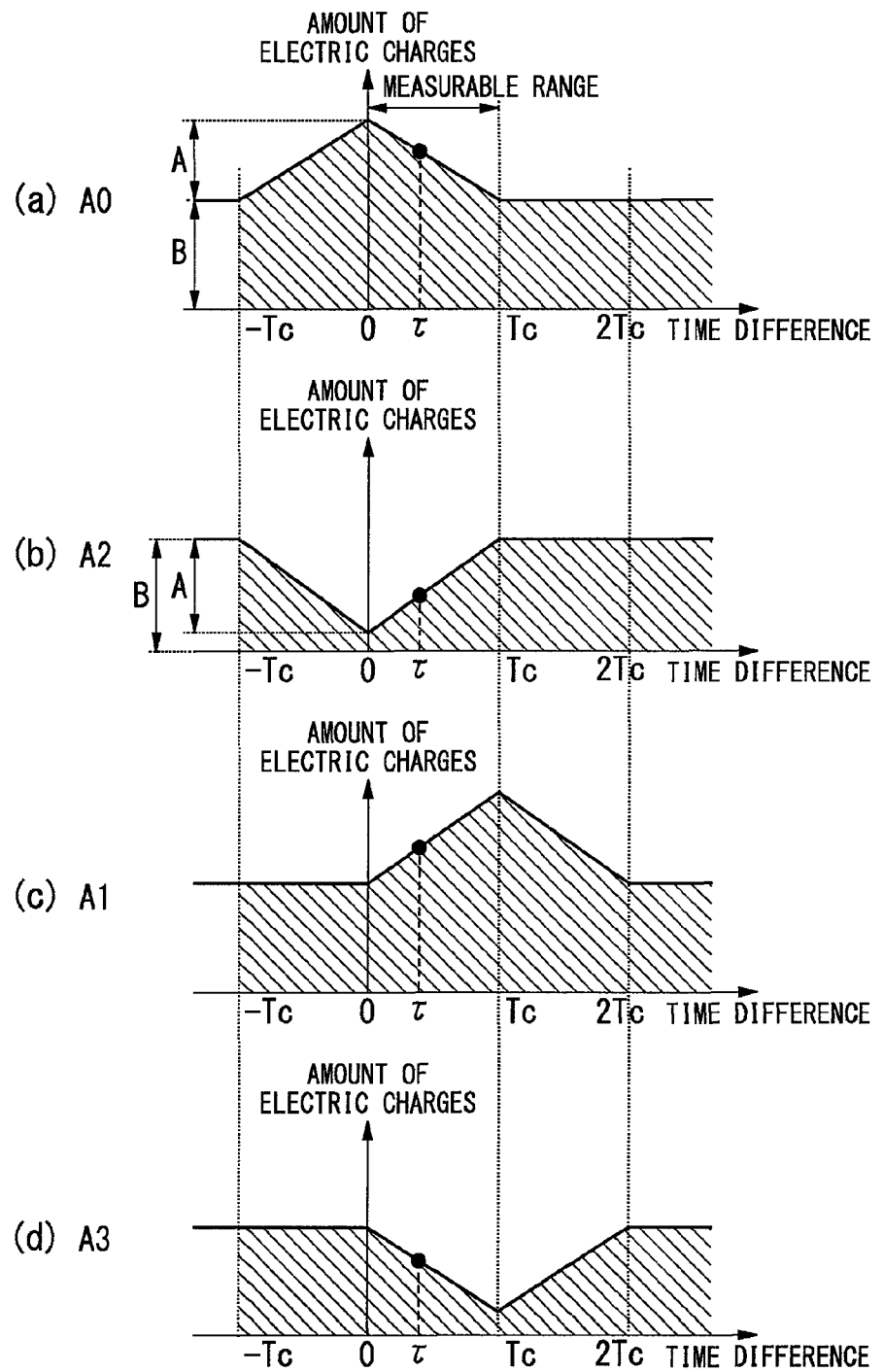
FIG. 5 is an explanatory diagram illustrating an operation of the spatial information detection device of the above first embodiment.

Consequently, as shown in FIG. 5, when the time difference $\tau$ is equal to 0 or more and is equal to Tc or less, the amounts A0 and A3 of the electric charges are decreased with an increase in the time difference $\tau$, and the amounts A1 and A2 of the electric charges are increased with an increase in the time difference $\tau$. Further, when the time difference $\tau$ is more than Tc and is equal to 2Tc or less, the amounts A0 and A2 of the electric charges are kept constant, and the amount A1 of the electric charges is decreased with an increase in the time difference $\tau$, and the amount A3 of the electric charges is increased with an increase in the time difference $\tau$. When the time difference τ is equal to 2Tc or more, all the amounts A0 to A3 of the electric charges are kept constant. Note that, actually, the time difference τ is not negative. However, in principle, when the time difference τ is equal to −Tc or more and is less than 0, the amounts A1 and A3 of the electric charges are kept constant, and the amount A0 of the electric charges is decreased with an increase in the absolute value of the time difference τ, and the amount A2 of the electric charges is increased with an increase in the absolute value of the time difference τ.

In theory, the amounts A0 to A3 of the electric charges satisfy an equation of A0+A1+A2+A3=constant. Further, when the time difference τ is "0", the amount A0 of the electric charges is equal to a half of the amount of the electric charges generated when the light is received throughout the entire accumulation time period. Similarly, when the time difference τ is equal to the chip duration Tc, the amount A1 of the electric charges is equal to a half of the amount of the electric charge generated when the light is received throughout the entire accumulation time period.

Hence, the amounts A0 to A3 of the electric charges corresponding to the amounts of the light received in the collection time periods designated by the demodulation signals are represented by the following formulae (1) to (4) respectively under the condition where "τ" is equal to 0 or more and is equal to Tc or less, wherein "A" denotes a component of the signal light and "B" denotes a component of environmental light.

[FORMULA 1]

$$A0 = -\frac{A}{Tc}(\tau - Tc) + B \quad (1)$$

$$A1 = \frac{A}{Tc}\tau + B \quad (2)$$

$$A2 = \frac{A}{Tc}(\tau - Tc) + B \quad (3)$$

$$A3 = -\frac{A}{Tc}\tau + B \quad (4)$$

In this regard, values of the components "A" and "B" depend on an intensity of environmental light and surrounding light (hereinafter referred to collectively as "environmental light") and an attenuation rate of light for a path through which the signal light projected to the space by the light emission source 111 passes before the signal light is received by the imaging element 121. This attenuation rate is defined by parameters including a reflectance of the object 1 and a transmittance of a medium which light passes through. Therefore, the value (A/Tc) is also defined by parameters including the intensity of the environmental light, the reflectance, and the transmittance. Since normally the transmittance of the medium may be considered to be constant, it is presumable that the value (A/Tc) depends on the reflectance of the object 1.

Incidentally, the time difference τ [s] calculated from the above formulae can be expressed by the following formula (5)

[FORMULA 2]

$$\tau = \frac{Tc}{1 + \frac{A0 - A2}{A1 - A3}} \quad (5)$$

Further, when the distance to the object 1 is denoted by "L" [m] and the speed of light is denoted by "c" [m/s], the distance L can be expressed using the time difference "τ" by an equation of L=c*τ/2.

For example, when the chip duration Tc is 100 [ns], since τ is within the range of 0 to 100 [ns], L is within the range of 0 to 15 [m]. Therefore, measurement of the distance to the object 1 is enabled while the measurable range has an upper limit of 15 [m]. In brief, the calculation unit 30 serving as the spatial information detection unit calculates the distance to the object 1 by means of performing the aforementioned calculation by use of the amounts of the electric charges generated within the collection time periods designated by the demodulation signals generated by the modulation signal generation unit 32.

Besides, as apparent from the formulae for calculating the time difference %, since a difference between the amounts A0 and A2 of the electric charges and a difference between the amounts A1 and A3 of the electric charges are used, the component "B" is canceled, and further, the component "A" is also canceled by performing subtraction between the amounts of the electric charges. In brief, with calculating the time difference % by use of the above formula, the time difference τ can be calculated irrespective of the component of the environmental light and the attenuation rate of light for the path through which light passes after projected and before received.

Note that, as apparent from the above formulae, with using only three of the four kinds of the amounts A0 to A4 of the electric charges, the time difference % [s] can be calculated irrespective of the component of the environmental light and the attenuation rate of light. For example, A1 minus A2 is equal to A, and A1 minus A3 is equal to 2(A/Tc)*τ. Hence, the time difference % is expressed by the following formula (6).

[FORMULA 3]

$$\tau = \frac{Tc}{2} \cdot \frac{A1 - A3}{A1 - A2} \quad (6)$$

Moreover, when the environmental light is ignorable, A is considered to be equal to B. Therefore, with calculating two of the amounts A0 to A3 of the electric charges with regard to a known distance (know time difference τ), (A/Tc), A, and B can be determined. In brief, the time difference τ [s] can be determined by use of a combination of two selected from the four kinds of the amounts A0 to A4 of the electric charges.

Furthermore, when the environmental light is ignorable, A is considered to be equal to B. When the reflectance of the object 1 is constant (invariable), (A/Tc) is considered to be constant. Therefore, with calculating any one of the amounts A0 to A3 of the electric charges with regard to a known distance (know time difference τ), the constant values (A/Tc), A, and B (actually, one of these constant values) can be determined. For example, τ is expressed by an equation of τ=2{1−(A0/A)}Tc. Hence, with determining the amount A0 of the electric charges, the time difference τ [s] can be calculated. The time difference τ [s] may be calculated from not only the amount A0 of the electric chargers but also any one of the other amounts A1, A2, and A3 of the electric charges.

To obtain the amounts A0, A1, A2, and A3 respectively corresponding to the four kinds of the demodulation signals by use of the imaging element 121, it is sufficient that accumulation of electric charges is performed for each of the collection time periods designated by the respective demodulation signals, and the amounts A0, A1, A2, and A3 corresponding to the demodulation signals are ejected. In this case, the amount (A0, A1, A2, A3) of the electric charges is ejected for each demodulation signal. Therefore, to generate the distance image, a process of ejecting the amount (A0, A1, A2, A3) of the electric charges is performed four times.

The aforementioned operation is available for the normal imaging element 121 in which one light receiving region is associated with one pixel. However, a dedicated imaging device 121 in which the plurality of light receiving regions are associated with one pixel is available. In the dedicated imaging element 121 for generating the distance image, adjacent four light receiving regions are treated as a single group. Such light receiving regions may be arranged in a 1 by 4 matrix manner or a 2 by 2 matrix manner. In this case, any one of the light receiving regions included in the same group is used to collect the electric charges within the collection time period associated with any one of the demodulation signals. According to the imaging element 121 with this configuration, the single distance value is determined by use of the four light receiving regions. So long as the total of the areas of the light receiving regions is the same as that of the case where one light receiving region is associated with one distance value, the resolution is decreased. In contrast, the four kinds of the amounts A0 to A3 of the electric charges are obtained from the imaging element 121 at one time. According to this instance, it is possible to decrease the number of times of reading out the electric charges necessary for creating the distance image corresponding to a screen size. Thus, it is possible to shorten the time necessary for creating the distance image corresponding to the screen size. Further, a smooth dynamic image can be created by use of the distance images.

Each of the amounts A0 and A3 of the electric charges out of the amounts A0, A1, A2, and A3 of the electric charges is expressed as a linear function which has a negative slope while the time difference τ is within the range of 0 to Tc. However, when the time difference τ exceeds the chip duration Tc, each of the amounts A0 and A3 of the electric charges becomes the constant value B. Further, each of the amounts A1 and A2 of the electric charges is expressed as a linear function which has a positive slope while the time different τ is within the range of 0 to Tc, and is also expressed as a linear function which has a negative slope while the time different τ is more than Tc and is equal to 2Tc or less. However, when the time difference τ exceeds the double chip duration 2Tc, each of the amounts A1 and A2 of the electric charges becomes the constant value B.

In summary, while τ is within the range of 0 to Tc, A0 minus A2 is equal to −2(A/Tc)*τ+2A. Therefore, A0−A2=2(A/Tc)(Tc−τ) is greater than 0. In contrast, while τ is greater than Tc, A0 minus A2 is equal to 0. Hence, measurement of the distance to the object 1 is impossible. In other words, the distance corresponding to τ equal to Tc defines the upper limit of the measurable range.

(Intensity Measurement Device)

The following explanation is made to the intensity measurement device configured to measure the intensity of light reflected by the object 1. The intensity measurement device has a light projection period in which the light emission source 111 projects the signal light to the space and a non-light projection period in which the light emission source 111 does not project the signal light to the space. The intensity measurement device measures the intensity of the reflected light by means of eliminating the component of the environmental light detected within the non-light projection period from the light received within the light projection period.

In the distance measurement device shown in FIG. 1, the light emission source 111 emits continuously the signal light modulated with the modulation signal. The intensity measurement device is different from this distance measurement device in that the light projection period in which the signal light is produced from the light emission source 111 and the non-light projection period in which the signal light is not produced are provided. In other words, the light projecting unit 11 is configured to emit the signal light within the light projection period and not emit the signal light within the non-light projection period. Further, the intensity measurement device is different from the distance measurement device shown in FIG. 1 in that the calculation unit 30 calculates not the distance value but the gray value.

The light projection period in which the signal light is emitted from the light projecting unit 11 and the non-light projection period in which the signal light is not emitted are selected to be enough longer than the chip duration Tc. The calculation unit 30 generates the grayscale image having, as the pixel value, the intensity of the reflection light which is the signal light emitted from the light emission source 111 and reflected by the object 1. The light received by the imaging element 121 in the light projection period in which the light emission source 111 emits the signal light to the space includes the component of the signal light and the component of the environmental light. The light received by the imaging element 121 in the non-light projection period in which the light emission source 111 does not emit the signal light to the space includes only the component of the external light (i.e., the component of the environmental light). Hence, when the intensity of the environmental light is not varied during a period defined by a combination of the light projection period and the non-light projection period, theoretically, a difference between the amount of the electric charges accumulated by the imaging element 121 within the light projection period and the amount of the electric charges accumulated by the imaging element 121 within the non-light projection period includes only the component of the signal light.

The following explanation is made with regard to the amounts A0 and A1 of the electric charges. In the light projection period, the amounts A0 and A1 of the electric charges are expressed by the following formulae (7) and (8) respectively. Note that, a suffix "L" is attached to the amount of the electric charges obtained in the light projection period, and a suffix "D" is attached to the amount of the electric charges obtained in the non-light projection period.

[FORMULA 4]

$$A0L = -\frac{A}{Tc}(\tau - Tc) + B \tag{7}$$

$$A1L = \frac{A}{Tc}\tau + B \tag{8}$$

Further, when a ratio in length of the light projection period to the non-light projection period is 1:1, the amounts A0 (A0D) and A1 (A1D) of the electric charges in the non-light projection period satisfy an equation of A0D=A1D=B.

Hence, with regard to the amount A0 of the electric charges, a difference between the amounts of the electric charges respectively associated with the light projection period and the non-light projection period is represented by ΔA0=A0L−A0D=(A/Tc)(Tc−τ). With regard to the amount A1 of the electric charges, a difference between the amounts of the electric charges respectively associated with the light projection period and the non-light projection period is represented by ΔA1=A1L−A1D=(A/Tc)τ. The sum of these differences is expressed by the following formula (9). As a result, the component "A" of the signal light can be determined.

[FORMULA 5]

$$\Delta A0 + \Delta A1 = \frac{A}{Tc}(Tc - \tau) + \frac{A}{Tc}\tau = \frac{A}{Tc}Tc = A \qquad (9)$$

The resultant grayscale image is a grayscale image related to the reflection light derived from the signal light, and the component of the environmental light is eliminated from the pixel value of the resultant grayscale image or the component of the environmental light in the pixel value of the resultant grayscale image is reduced. Hence, in order to distinguish between the pixel value of the resultant grayscale image and the normal gray value including the component of the environmental light, the pixel value of the resultant grayscale image is hereinafter referred to as "reflection intensity value". Further, in order to distinguish between the image having the reflection intensity value as the pixel value and the normal grayscale image, the image having the reflection intensity value as the pixel value is hereinafter referred to as "reflection intensity image". In brief, the image obtained by the calculation unit 30 is the reflection intensity image having as the pixel value the reflection intensity value which is derived from the projected signal light and the received signal light. Hence, the intensity measurement device is considered as an active type imaging device configured to generate the reflection intensity image having as the pixel value the reflection intensity value corresponding to the signal light emitted from the light emission source 111.

In this reflection intensity image, the component of the environmental light is eliminated or reduced. Therefore, under a certain condition, this reflection intensity image can be considered as a grayscale image of the object 1. Thus, the reflection intensity image is useful for application in which a characteristic amount of the object 1 is calculated from the image, for example, face authentication performed based on an image.

The aforementioned operation is described with regard to a case where the ratio in length of the light projection period to the non-light projection period is 1:1. However, the ratio in length of the light projection period to the non-light projection period may not be 1:1. In other words, the ratio in length of the light projection period to the non-light projection period may be appropriately set, and the difference may be calculated by multiplying the amount of the electric charges by a coefficient corresponding to such a ratio. For example, the non-light projection period is shorter than the light projection period. In this case, in contrast to a case where the ratio in length of the light projection period to the non-light projection period is 1:1, the total of the light projection period and the non-light projection period can be shortened. Consequently, it is possible to shorten time necessary to generate the reflection intensity image.

As apparent from the aforementioned operation, to measure the intensity of the reflection light, use of a single demodulation signal for defining the light projection period and the non-light projection period is sufficient to measure the intensity of the reflection light. In brief, since only the signal component is calculated by use of a difference between the amounts of the electric charges respectively associated with the light projection period and the non-light projection period, use of a single demodulation signal enables measurement of the intensity of the reflection light without depending on the external light component.

In the aforementioned operation instance, to calculate the reflection intensity value, a combination of the amounts A0 and A1 of the electric charges is used. A combination of any one of the amounts A0 and A2 of the electric charges and any one of the amounts A1 and A3 of the electric charges can be available.

Further, in a case where like the distance measurement device the four kinds of the amounts A0, A1, A2, and A3 of the electric charges are obtained, two differences (A0−A2) and (A1−A3) between the amounts of the electric charges are available. The differences (A0−A2) and (A1−A3) between the amounts of the electric charges are expressed by the following formulae (10) and (11), respectively.

[FORMULA 6]

$$A0 - A2 = 2\frac{A}{Tc}(Tc - \tau) \qquad (10)$$

$$A1 - A3 = 2\frac{A}{Tc}\tau \qquad (11)$$

Therefore, the relation expressed by the following formula (12) can be obtained from the sum of the above differences.

[FORMULA 7]

$$A0 + A1 - A2 - A3 = 2\frac{A}{Tc}Tc = 2A \qquad (12)$$

According to this process, the steps which are performed until the differences (A0−A2) and (A1−A3) between the amounts of the electric charges are obtained are the same as those for the distance measurement device. Hence, it is possible to serve as both the distance measurement device and the intensity measurement device.

(Technique of Preventing False Detection Caused by Unintended Object)

The following explanation is made to a technique of preventing false detection of the spatial information in a case where a transparent object 2 which is considered to be an unintended object such as a glass plate is present between a spatial information detection device 3 and a space (intended area) to be searched. The transparent object 2 is defined as an object which allows the signal light emitted from the light emission source 111 to pass through. The transparent does not necessarily allow visible light to pass through. Further, the following explanation is related to the spatial information detection device 3 serving as the distance measurement device configured to generate the distance image. However, the same technique is available to the spatial information detection device serving as the intensity measurement device configured to generate the grayscale image. Additionally, the same technique is available to a case where the light receiving element including the single light receiving region is used as the light receiving unit 12. For example, even when the transparent object 2 is not present, an object 4 treated as the unintended object may be present in a region (unintended area) between the space (intended area) to be searched for the spatial information and the spatial information detection device 3. Even in this case, the false detection of the spatial information can be prevented by use of the following technique. In summary, when the unintended object such as the transparent object 2 and the object 4 exists in the area (unintended area) between the space (intended area) selected as the target for detecting the spatial information and the spatial information detection device 3, light reflected by the unintended object is likely to reach the spatial information detection device 3. In this case, the false detection can be prevented by use of the following technique.

(Principle)

For example, the transparent object 2 which causes the false detection by the distance measurement device 3 (spatial information detection device) is a window plate or a partition plate. While the distance measurement device is in use, a relative position of the distance measurement device to the transparent object is considered to be invariable. Hence, when the position of the transparent object 2 relative to the spatial information detection device 3 is known and electric charges corresponding to the transparent object 2 can be removed from electric charges generated by the distance measurement device 3, it is expected that the effect caused by the transparent object 2 can be eliminated.

Based on this idea, the following explanation is made to a technique of: generating correction information from information regarding the space area (unintended area) in which the transparent object 2 exists; and providing the correction information to the calculation unit 30 to calculate the distance value corrected with the correction information. In other words, the correction information is information regarding the electric charges generated by the light receiving unit 12 in response to light from the unintended area between the intended area and the set of the light projecting unit 11 and the light receiving unit 12 (i.e., the spatial information detection device).

When the transparent object 2 is absent between the distance measurement device 3 and the object 1 which exists in the space to be searched, the amount A0 of the electric charges is expressed by an equation defined by the following formula (13) as mentioned above.

[FORMULA 8]

$$A0 = -\frac{A}{Tc}(\tau - Tc) + B \tag{13}$$

In contrast, when the transparent object 2 is present between the distance measurement device 3 and the space to be searched, and when the object 1 is not present in this space, the amount gA0 of the electric charges corresponding to the amount A0 of the electric charges is expressed by an equation defined by the following formula (14).

[FORMULA 9]

$$gA0 = -\frac{gA}{Tc}(g\tau - Tc) + gB \tag{14}$$

In this explanation, letter "g" is attached as a prefix to denote that the transparent object 2 is present. For example, the symbol "gA" denotes the component of the signal light reflected by the transparent object 2 (the component derived from light from the unintended area out of the signal light), and the symbol "gB" denotes the component of the environmental light in a case where only the transparent object 2 is present. The symbol "gτ" denotes the time difference derived from light reflected by the transparent object 2 (the flight time related to the transparent object 2). In other words, the component (unintended component) gA is the amount of the electric charges corresponding to the electric charges generated by the light receiving unit 12 in response to light from the unintended space. The time difference gτ is the flight time (unintended flight time) starting from time when the light projecting unit 11 emits the signal light and ending on time when the light receiving unit 12 receives the light reflected by the unintended object (transparent object) 2 present in the unintended area. The unintended object is defined as an object which causes light from the unintended area. In the following explanation, to denote the presence of the transparent object 2, the prefix "g" is attached in a similar manner as above.

When the object 1 is present in the space (intended area) to be searched and when the transparent object 2 exists in an area (i.e., the unintended area) between this space and the distance measurement device 3, the amount bA0 of the electric charges corresponding to the amount A0 of the electric charges is equal to the sum of A0 and gA0, and is expressed by an equation defined by the following formula (15).

[FORMULA 10]

$$bA0 = A0 + gA0 = A0 - \frac{gA}{Tc}(g\tau - Tc) + gB \tag{15}$$

Likewise, the amounts bA1, bA2, and bA3 of the electric charges corresponding to the amounts A1 to A3 of the electric charges are expressed by the equations defined by the following formulae (16), (17), and (18), respectively.

[FORMULA 11]

$$bA1 = A1 + gA1 = A1 + \frac{gA}{Tc}g\tau + gB \tag{16}$$

$$bA2 = A2 + gA2 = A2 + \frac{gA}{Tc}(g\tau - Tc) + gB \tag{17}$$

$$bA3 = A3 + gA3 = A3 - \frac{gA}{Tc}g\tau + gB \tag{18}$$

By use of these relations, the differences (A0−A2) and (A1−A3) which are necessary to calculate the true distance are expressed by the following formulae (19) and (20), respectively.

[FORMULA 12]

$$A0 - A2 = (bA0 - bA2) + \frac{2gA}{Tc}(g\tau - Tc) \tag{19}$$

$$A1 - A3 = (bA1 - bA3) - \frac{2gA}{Tc}g\tau \tag{20}$$

With regard to these relational expressions, the distance measurement device can calculate the differences (bA0−bA2) and (bA1−bA3) from the light receiving amounts. Hence, unknown values are the component gA of the signal light included in the light reflected by the transparent object 2 and the time difference gτ related to the light reflected by the transparent object 2. In other words, if the component gA of the signal light and the time difference gτ related to the transparent object 2 can be calculated, the differences (A0−A2) and (A1−A3) can be calculated based on the amounts bA0, bA1, bA2, and bA3 which are obtained under a condition where the light reflected by the object 1 and the light reflected by the transparent object 2 coexist.

In brief, the component gA of the signal light and the time difference gτ which are obtained with regard to the transparent object 2 can be treated as the correction information. Further, according to the aforementioned formulae, the amounts of the electric charges (light receiving amount A0, A1, A2, and A3) caused by the reflection at the object 1 are calculated by eliminating the amounts of the electric charges caused by the existence of the transparent object 2 from the amounts of the electric charges (light receiving amounts bA0, bA1, bA2, and bA3) accumulated by the charge accumulator of the distance measurement device 3. The amount of the electric charges caused by the existence of the transparent object 2 is assumed to be the amount of the electric charges increased by reflection of light by the transparent object 2 mainly. However, the amount of the electric charges caused by the existence of the transparent object 2 may include the amount of the electric charges reduced by transmission of light by the transparent object 2.

The following explanation is made to a technique of calculating the component gA of the signal light and the time difference gτ defined as the correction information. As mentioned above, the rectangular wave signal having the two signal values is used as the modulation signal for modulating the signal light, and the duration for each signal value of the rectangular wave signal is equal to an integral multiple of the chip length (unit time period) Tc and is varied randomly. Therefore, as described in the above, the measurable range for the distance to the object 1 calculated from the amounts A0 to A3 of the electric charges has an upper limit. For example, when the single chip duration Tc is 100 [ns], the measurable range is 0 to 15 [m] so long as the first demodulation signal has the same phase as that of the modulation signal. The first, second, third, and fourth demodulation signals obtained under this condition are hereinafter referred to as first, second, third, and fourth reference demodulation signals, respectively.

When the respective reference demodulation signals which are shifted in a time axial direction while the relations between the respective reference demodulation signals are maintained are used as the demodulation signals, the measurable range is shifted by a distance corresponding to a time shifted. In brief, when the reference demodulation signals are used as the demodulation signals, the amount A0 of the electric charges is maximized at τ=0 and minimized at τ=Tc. When the demodulation signals are shifted from the corresponding reference demodulation signals by a shift period td, the amount A0 of the electric charges is maximized at τ=td and minimized at τ=Tc+td. Thus, the measurable range is shifted by Ld=c*td/2.

With using the aforementioned fact that the amount A0 of the electric charges (or one of the other amounts A1, A2, and A3 of the electric charges) changes when the demodulation signals are shifted from the corresponding reference demodulation signals by the shift period td, a change in the amount of the electric charges caused by the transparent object 2 can be calculated as described below. For example, with varying the shift period td for shifting the demodulation signal from the reference demodulation signal, the amounts of the electric charges respectively corresponding to the different shift periods td are obtained, and the correction information for eliminating the effect caused by the transparent object 2 can be obtained. Hereinafter, the demodulation signal which is shifted from the reference demodulation signal by the shift period td in the time axial direction is referred to as a search demodulation signal (search signal). In the following explanation, the positive shift period td denotes that the search signal is delayed from the demodulation signal by the shift period td. Further, the negative shift period td denotes that the search signal is advanced from the demodulation signal by the shift period td.

Note that, in the aforementioned explanation, the reference demodulation signal is generated based on the modulation signal, and the search demodulation signal is shifted in the time axial direction from the reference demodulation signal. This is equivalent to a case where the reference demodulation signal is used as the search demodulation signal and the modulation signal is shifted in the time axial direction. In other words, the second, third, and fourth reference demodulation signals may be generated under a condition where the first reference demodulation signal is identical to the reference signal, and the modulation signal may be shifted from the first reference demodulation signal in the time axial direction. However, a direction of the shift in the time axis in a case where the reference demodulation signal is shifted is opposite to a direction of the shift in the time axis in a case where the modulation signal is shifted.

When only the transparent object 2 is present in the measurable range of the distance measurement device with regard to the distance, and when the shift periods td are 0, -ta, -(Tc-gτ), and -tb, the amounts gA0[0], gA0[-ta], gA0[-(Tc-gτ)], and gA0[-tb] are expressed by the following formulae (21), (22), (23), and (24), respectively. Note that, the symbol "gA0[td]" denotes the amount gA0 of the electric charges associated with the shift period of td. Further, the relation of -ta>-(Tc-gτ)>-tb is satisfied.

[FORMULA 13]

$$gA0[0] = -\frac{gA}{Tc}(g\tau - Tc) + gB \quad (21)$$

$$gA0[-ta] = -\frac{gA}{Tc}(g\tau - ta - Tc) + gB \quad (22)$$

$$gA0[-(Tc - g\tau)] = gB \quad (23)$$

$$gA0[-tb] = gB \quad (24)$$

Figure 6:
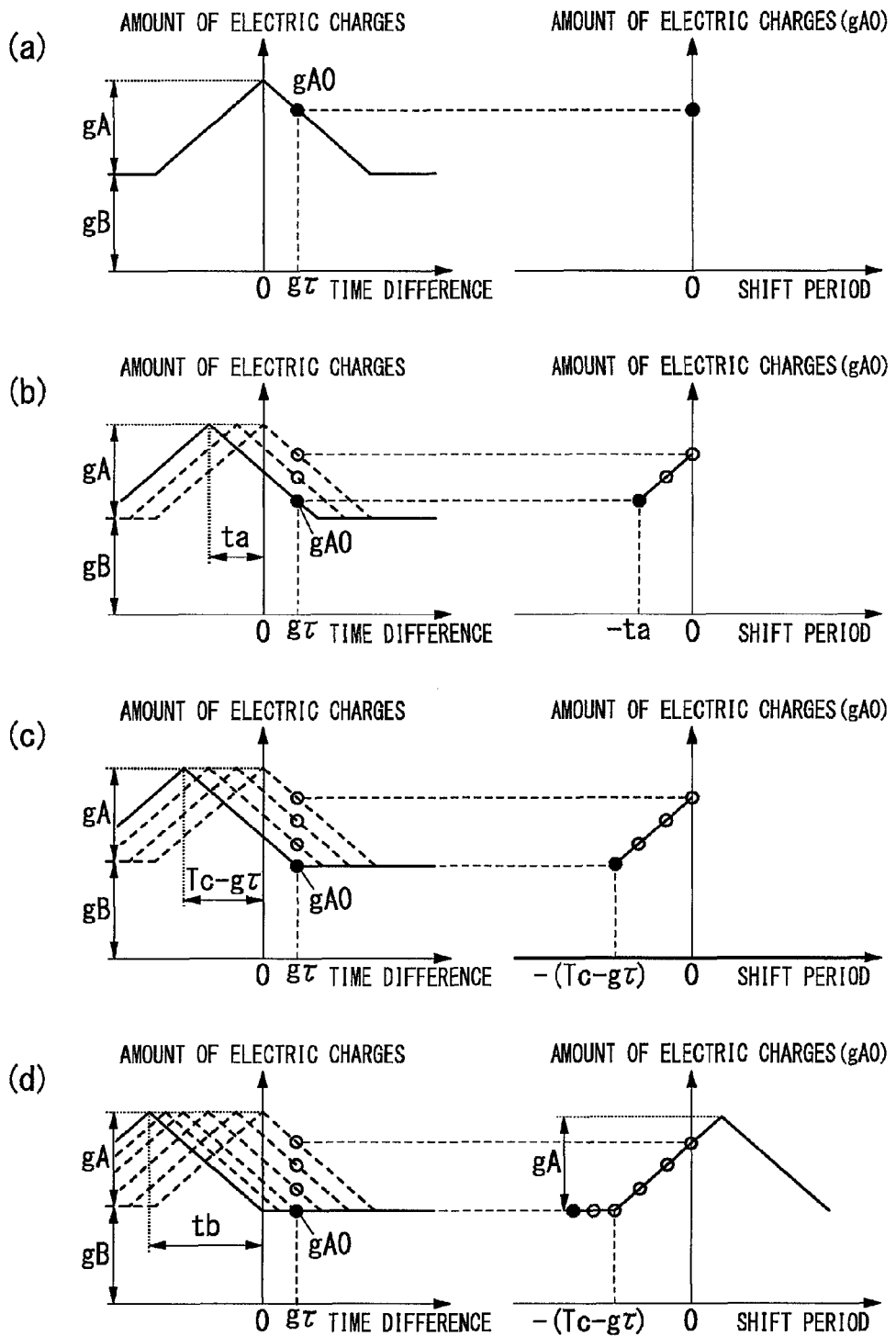
FIG. 6 is an explanatory diagram illustrating an operation of the spatial information detection device of the above first embodiment.

In FIGS. 6, (a), (b), (c), and (d) show relations of the amounts gA0[0], gA0[-ta], gA0[(Tc-gτ)], and gA0[-tb] corresponding to the shift periods td of 0, -ta, -(Tc-gτ), and -tb, respectively. With regard to FIGS. 6 (a), (b), (c), and (d), each left chart illustrates a relation between the amount gA0 of the electric charges and the distance to the transparent object 2, and each right chart illustrates a relation between the shift period td and the amount gA0 of the electric charges under a condition where the time difference τ derived from the light reflected by the transparent object 2 is gτ.

As apparent from FIG. 6, when the shift period td becomes equal to -(Tc-gτ) or less, the amount gA0 of the electric charges is related to only the component gB of the environmental light and becomes constant. Hence, with obtaining the amount gA0 of the electric charges corresponding to the shift period td with varying the shift period td, the time difference gτ can be obtained from the shift period td at which the amount gA0 of the electric charges become invariable. In other words, the distance to the transparent object 2 can be determined. Further, with obtaining the amounts gA0 of the electric charges respectively related to the plurality of shift periods td in a range (-(Tc-gτ)≤td≤0) in which the amount gA0 of the electric charges is varied with the shift period td, a change rate (=gA/Tc) of the amount gA0 of the electric charges to the shift period td can be calculated. The component gA of the signal light can be calculated from the change rate and the known information (unit time period Tc). In brief, the component gA of the signal light and the time difference gτ serving as the correction information relating to the existence of the transparent object 2 can be calculated.

When the correction information gA and gτ is obtained, with using the correction information gA and gτ together with the amounts bA0, bA1, bA2, and bA3 of the electric charges in the process of measuring the distance to the object 1 by the distance measurement device as mentioned above, it is possible to eliminate the effect caused by the transparent object 2. In other words, the value of (A0−A2) and (A1−A3) can be calculated by means of eliminating, by use of the relations defined by the following formulae (25) and (26), the effect caused by the transparent object 2 from the amounts (bA0−bA2) and (bA1−bA3) of the electric charges obtained by the distance measurement device.

[FORMULA 14]

$$A0 - A2 = (bA0 - bA2) + \frac{2gA}{Tc}(g\tau - Tc) \quad (25)$$

$$A1 - A3 = (bA1 - bA3) - \frac{2gA}{Tc}g\tau \quad (26)$$

Figure 7:
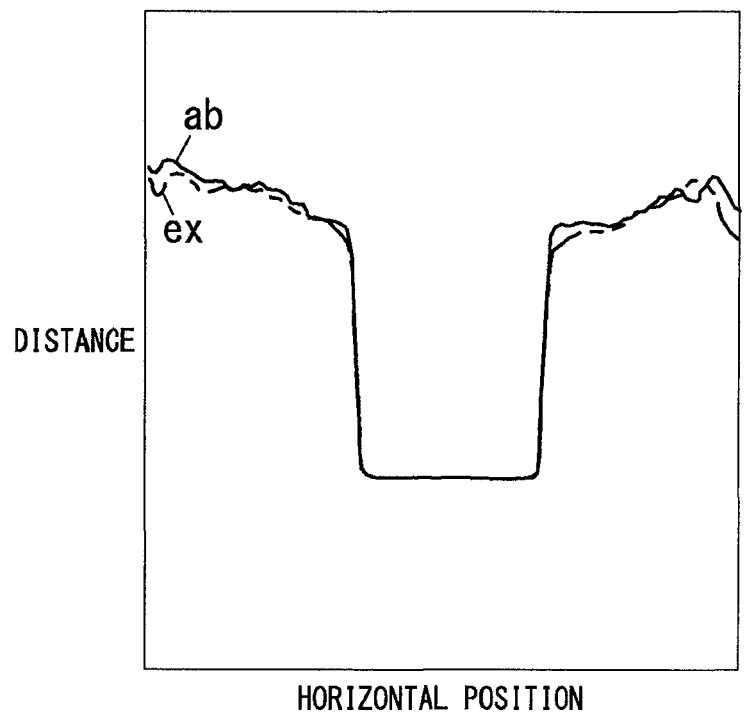
FIG. 7 is a diagram illustrating a distance measured by the spatial information detection device of the above first embodiment.
Figure 8:
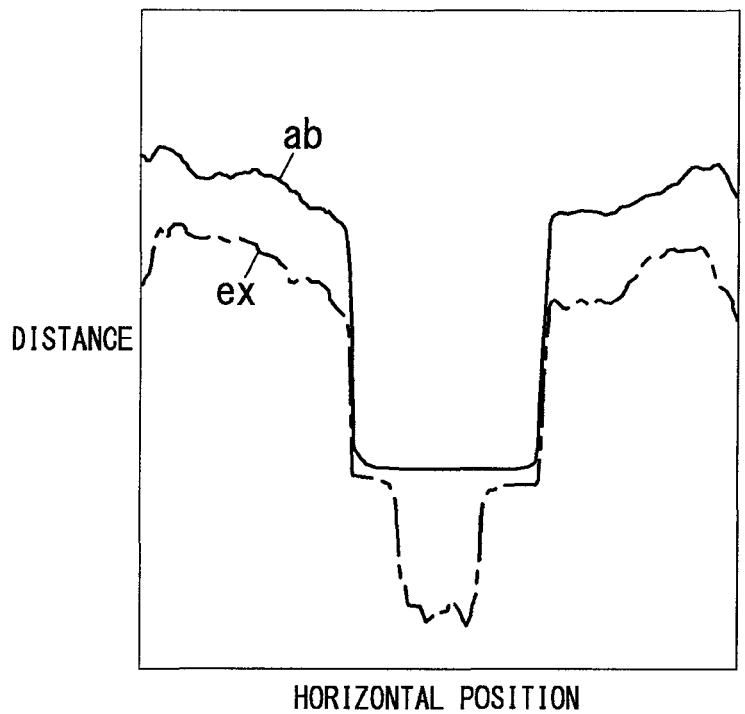
FIG. 8 is a diagram illustrating a distance measured by the spatial information detection device of a comparative example.

FIG. 7 and FIG. 8 show measurement results obtained by use of this technique. FIG. 8 relates to an example where the correction information (gA and gτ) is used, and FIG. 8 relates to a comparative example where the correction information (gA and gτ) is not used. Further, in each of FIG. 7 and FIG. 8, line "ab" denotes the distance to the object 1 calculated under a condition where the transparent object 2 is absent, and line "ex" denotes the distance to the object 1 calculated under a condition where the transparent object 2 is present. FIG. 8 shows that the measured distance is greatly changed according to whether the transparent object 2 exists. FIG. 7 shows that the measured distance is insusceptible to whether the transparent object 2 exists.

Figure 3:
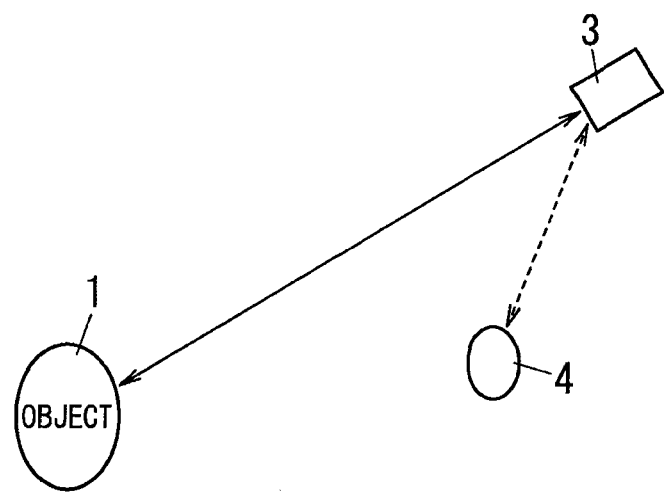
FIG. 3 is a side view illustrating how to use the spatial information detection device of the above first embodiment.

In the above explanation, the unintended object is the transparent object 2. However, also in a case where the object 4 different from the transparent object 2 exists in a vicinity (unintended area) of the distance measurement device 3 (spatial information detection device) as shown in FIG. 3, the effect caused by whether the object 4 exists can be eliminated, by use of a similar principle as mentioned above. When the object 4 which is the unintended object is present adjacent to the distance measurement device 3, like a case where the transparent object 2 exists, reflection light (secondary reflection component) caused by scattering on a surface of the object 4 is likely to come into the distance measurement device 3, and the light receiving amount (amount of the electric charges) may be increased relative to a case where the object 4 is absent. The effect caused by the secondary reflection component is increased with a decrease in a distance between the distance measurement device 3 and the object 4. The secondary reflection component caused by the object 4 reaches the distance measurement device 3 through a path different from that for the component of the light reflected by the transparent object 2. However, either component is added to the component of the light reflected by the object 1. Hence, the effect caused by the presence or absence of the object 4 can be equally treated in a similar manner as the component of the light reflected by the transparent object 2. Therefore, with using the aforementioned principle, the effect caused by the presence or absence of the object 4 can be eliminated.

(First Embodiment)

As shown in FIG. 1, the spatial information detection device of the present embodiment includes the light projecting unit 11, the light receiving unit 12, the calculation unit 30, the code generator 31, the modulation signal generation unit 32, the demodulation signal generation unit 33 and a correction information provision unit 34. In brief, the present embodiment includes the correction information provision unit 34 in addition to the basic configuration for generating the distance image.

The correction information provision unit 34 provides, to the calculation unit 30, the correction information gA and gτ used in calculation of the distance value (spatial information). The correction information provision unit 34 has a function of calculating the correction information gA and gτ in addition to a function of providing the correction information gA and gτ to the calculation unit 30. In brief, the correction information provision unit 34 is configured to generate the correction information regarding electric charges which the light receiving unit 12 produces in response to light from the unintended area existing between the intended area and the set of the light projecting unit 11 and the light receiving unit 12, and output the correction information to the calculation unit 30.

As described in the principle, when receiving the correction information gA and gτ from the correction information provision unit 34, the calculation unit 30 eliminates the effect caused by the transparent object 2 from the amounts (bA0−bA2) and (bA1−bA3) of the electric charges to obtain the values of (A0−A2) and (A1−A3). In brief, the calculation unit 30 removes the electric charges caused by the reflection at the transparent object 2 from the electric charges accumulated by the electric charge accumulator by use of the correction information gA and gτ to calculate the spatial information. In other words, the calculation unit 30 is configured to correct, by use of the correction information, the amount (bA0−bA2, bA1−bA3) of the signal electric charges as the amount (A0−A2, A1−A3) of intended electric charges corresponding to the electric charges which the light receiving unit 12 produces in response to light from the intended area, and generate the spatial information (distance L) based on the amount of the intended electric charges.

As apparent from the aforementioned principle, in order to calculate the correction information, it is necessary to obtain the relation between the shift period td and the amount bA0 of the electric charges by means of variously changing a relative phase (shift period td) between the modulation signal and the search demodulation signal. Note that, the shift period td is varied by a unit period shorter than the single chip duration Tc. Further, before the measurement of the distance to the object 1 is performed, the correction information gA and gτ needs to be calculated in advance. Thus, an operation of calculating the correction information gA and gτ regarding the transparent object 2 needs to be performed in addition to an operation of calculating the distance to the object 1.

The correction information provision unit 34 performs at an appropriate timing the operation of calculating the correction information gA and gτ. For example, the correction information provision unit 34 may obtain the correction information gA and gτ at predetermined periodic timings. Further, the correction information provision unit 34 may judge whether the object 1 is present in the space (intended area) selected as the target for detecting the spatial information, and, upon concluding that the object 1 is absent, may obtain the correction information gA and gτ. For example, to judge whether the object 1 exists, the spatial information (e.g., an image) obtained when the object 1 is absent is stored preliminarily and each time the spatial information is obtained, the obtained spatial information is compared with the preliminarily stored spatial information. For example, each time the spatial information is obtained, the correction information provision unit 34 judges whether there is a substantial change in the obtained spatial information. When concluding there is no substantial change, the correction information provision unit 34 decides that the object 1 is absent.

The shift period td is corresponding to the relative phase (shift period td) between the modulation signal and the search demodulation signal. The correction information provision unit 34 includes a phase shift unit 341 in order to calculate the correction information gA and gτ by means of changing this phase (shift period td).

In the present embodiment, the demodulation signal generation unit 33 serves as a search signal generation unit configured to generate the search signal (search demodulation signal) and provide the generated search signal to the light receiving unit 12. The search signal is defined as a signal having a predetermined time difference (shift period td) relative to the modulation signal.

The light receiving unit (photoelectric converter) 12 is configured to produce an amount of electric charges corresponding to an intensity of light received from the space within a collection time period (second collection time period) defined as a period in which the search signal has a high level. The light receiving unit (photoelectric converter) 12 is further configured to accumulate the electric charges produced within the collection time period (second collection time period) over a predetermined accumulation time period (second accumulation time period) longer than the collection time period (second collection time period) and provide, as an amount of correction electric charges, the amount of the accumulated electric charges to the correction information provision unit 34.

Alternatively, the second collection time period may be defined as a period in which the search signal has a low level. In brief, the light receiving unit 12 is configured to produce an amount of electric charges corresponding to an intensity of light received from the space within the second collection time period defined as one of a first period in which the search signal has a high level and a second period in which the search signal has a low level.

The phase shift unit 341 is configured to vary the time difference (shift period td) by a variation width shorter than the unit time period (single chip duration Tc) within a predetermined time range (search range) in order to allow the demodulation signal generation unit (search signal generation unit) 33 to generate the plurality of search signals with different time differences (shift periods td).

In other words, the phase shift unit 341 has a function of shifting the reference signal generated by the code generator 31 in the time axial direction (i.e., shifting the phase). Note that, as mentioned above, the shift period td is shifted by a unit period which is not equal to the single chip duration Tc but is shorter than the single chip duration Tc.

The range (search range) within which the phase shift unit 341 varies the shift period td is determined by a range setting unit 343. In brief, the range setting unit 343 has a function of selecting a range enabling obtaining the correction information relating to the transparent object 2 as the range within which the shift period td is varied. In other words, the range setting unit 343 of the present embodiment designates the search range for the phase shift unit 341.

The range setting unit 343 may be configured to select the range in response to a manual operation or configured to select the range automatically as mentioned below. In a case where the range is selected manually, in a process of installing the distance measurement device 3, the distance to the transparent object 2 is obtained by performing mechanical or visual measurement and the obtained distance is inputted into the range setting unit 343. The range setting unit 343 provides the shift period td to the phase shift unit 341 based on the inputted distance in order to obtain the correction information relating to the transparent object 2 around the inputted distance. In brief, the range setting unit 343 selects a time range (search range) based on the inputted distance.

The correction information provision unit 34 includes a correction information calculation unit 342 configured to calculate the correction information gA and gτ. The correction information calculation unit 342 is configured to obtain the correction electric charges from the light receiving unit 12 with regard to each of the search signals with the different time differences (shift periods td), and generate the correction information based on a relation between the time difference (shift period td) and an amount of the correction electric charges.

In summary, as mentioned in the above principle, the correction information calculation unit 342 calculates the correction information gA and gτ by use of the relation between the amount gA0 of the electric charges (amount of the correction electric charges) accumulated by the electric charge accumulator 123 (or any one of the other amounts gA1, gA2, and gA3 of the electric charges) and the shift period td. In other words, the correction information calculation unit 342 of the correction information provision unit 34 calculates the correction information gA and gτ regarding the transparent object 2 by use of the relations between the phase (shift period td) varied by the phase shift unit 341 and the amount gA0 of the electric charges (amount of the correction electric charges) corresponding to the varied phase.

The correction information provision unit 34 includes a correction information storage unit 344 configured to store the correction information gA and gτ calculated by the correction information calculation unit 342. In the process of generating the distance image regarding the object 1 by the calculation unit 30, the correction information gA and gτ which is calculated by the correction information calculation unit 342 in advance and stored in the correction information storage unit 344 is selected and the selected correction information gA and gτ is inputted into the relational formulae described in the principle to calculate the distance. In summary, the calculation unit 30 calculates the spatial information by use of the correction information gA and gτ stored in the correction information storage unit 344. As mentioned above, in the process of generating the distance image, the correction information gA and gτ is used. Hence, the distance image in which the effect caused by the transparent object 2 is eliminated can be generated.

The correction information gA and gτ may vary due to dirt on the transparent object 2, scratches on the transparent object 2, or a change in temperature. Hence, it is preferable that the correction information be updated at an appropriate timing. In view of this, the correction information provision unit 34 includes an update judgment unit 345 configured to, when a predetermined update condition is fulfilled, instruct (the correction information calculation unit 342) to update the correction information gA and gτ stored in the correction information storage unit 344. In other words, the correction information provision unit 34 is configured to judge whether the predetermined update condition is fulfilled, and to, upon concluding that the update condition is fulfilled, update the correction information.

For example, the update condition judged by the update judgment unit 345 is that a predetermined update period elapses. In other words, the correction information gA and gτ may be updated at a constant interval, or the time to update the correction information gA and gτ may be designated in advance. In a case where the spatial information corresponding to a transmittance of a medium is calculated by use of the aforementioned reflection intensity image, the update condition may be that the transmittance is decreased from an initial value by a prescribed value or more, and when the update condition is fulfilled, the correction information gA and gτ may be updated.

The following explanation is made to an operation of the spatial information detection device of the present embodiment.

The spatial information detection device of the present embodiment performs a process (spatial information generation process) of generating the spatial information and a process (correction information generation process) of generating the correction information. The correction information generation process is performed prior to the spatial information generation process.

In the correction information generation process, the range setting unit 343 selects the search range. For example, the search range is selected to indicate −tb≤td≤0.

The phase shift unit 341 selects the time difference (shift period td) within the search range selected by the range setting unit 343. For example, the phase shift unit 341 selects 0 as the shift period td.

The search signal generation unit (demodulation signal generation unit) 33 generates the search signal having the shift period td selected by the phase shift unit 341, and provides the generated search signal to the light receiving unit 12. For example, the search signal is generated based on the first demodulation signal.

Hence, the modulation signal generation unit 32 provides the modulation signal to the light projecting unit 11, and the search signal generation unit 33 provides the search signal to the light receiving unit 12.

When receiving the modulation signal, the light projecting unit 11 emits to the space including the intended area the signal light which is light modulated with the received modulation signal.

When receiving the search signal, the light receiving unit 12 treats, as the collection time period (second collection time period), the period in which the received search signal has the high level, and accumulates the electric charges relating to the space over the accumulation time period (second accumulation time period). The light receiving unit 12 provides the electric charges accumulated associated with the received search signal to the correction information calculation unit 342 as the correction electric charges.

When the correction electric charges are obtained with regard to the search signal, the phase shift unit 341 varies the time difference (shift period td) by a variation width less than the unit time period (single chip duration Tc) within the search range. For example, the phase shift unit 341 selects tc as the shift period td.

Each time the phase shift unit 341 selects the shift period td, the correction electric charges associated with the search signal having the shift period td selected by the phase shift unit 341 are obtained.

The correction information calculation unit 342 calculates the correction information (gA, gτ) on the basis of the amount of the correction electric charges (corresponding to the amount gA0 of the electric charges in the present instance) for each of the respective search signals with the different shift periods td. For example, the correction information calculation unit 342 checks the relation between the shift period td and the amount gA0 of the correction electric charges (see FIG. 6).

The correction information calculation unit 342 acquires the shift period td at which the change rate of the amount gA0 of the correction electric charges to the shift period td becomes 0. The shift period td at which the change rate of the amount gA0 of the correction electric charges to the shift period td becomes 0 is equal to the time difference gτ. Note that, the change rate need not be equal to 0 in a strict sense, but may be a value considered as 0 (i.e., the amount gA0 of the correction electric charges is constant).

The correction information calculation unit 342 calculates the change rate (=gA/Tc) of the amount gA0 of the electric charges to the shift period td within the range (−(Tc−gτ) ≤td≤0) in which the amount gA0 of the correction electric charges is varied with the shift period td. The correction information calculation unit 342 calculates a product of the calculated change rate (gA/Tc) and the unit time period (Tc). This product is equal to the amount gA of the unintended electric charges corresponding to light from the unintended area.

The correction information calculation unit 342 stores the correction information gA and gτ in the correction information storage unit 344.

As mentioned above, the spatial information detection device of the present embodiment performs the correction information generation process to generate the correction information (gA, gτ).

Next, the spatial information detection device of the present embodiment performs the spatial information generation process.

In the spatial information detection process, the demodulation signal generation unit 33 generates not the search signal but the first to fourth demodulation signals (see FIGS. 4 (c) to (f)).

Hence, the modulation signal generation unit 32 provides the modulation signal to the light projecting unit 11, and the demodulation signal generation unit 33 provides the first to fourth demodulation signals to the light receiving unit 12.

When receiving the modulation signal, the light projecting unit 11 emits to the space including the intended area the signal light which is light modulated with the received modulation signal.

When receiving the demodulation signal, the light receiving unit 12 treats, as the collection time period, the period in which the received demodulation signal has the high level, and accumulates the electric charges derived from the space over the accumulation time period. The light receiving unit 12 provides the electric charges accumulated associated with the received demodulation signal to the calculation unit 30 as the signal electric charges.

As a result, the calculation unit 30 acquires the signal electric charges (the amount bA0, bA1, bA2, and bA3 of the signal electric charges) respectively corresponding to the first to fourth demodulation signals. Further, the calculation unit 30 acquires the correction information (gA, gτ) from the correction information storage unit 344. The calculation unit 30 calculates the flight time τ from the amounts bA0, bA1, bA2, and bA3 of the signal electric charges, the correction information gA and gτ, and the chip duration Tc by use of the following formula (27). Thereafter, the calculation unit 30 calculates the distance L from the flight time τ (see the above formula (5)).

[FORMULA 15]

$$\tau = \frac{(bA1 - bA3)Tc - 2gA \cdot g\tau}{bA0 + bA1 - bA2 - bA3 - 2gA} \quad (27)$$

Consequently, the distance L in which the effect derived from the unintended area is eliminated can be obtained. In this manner, the calculation unit 30 corrects the amount of the signal electric charges (amount bA0, bA1, bA2, bA3 of the electric charges) as the amount (A0, A1, A2, A3) of the intended electric charges, by use of the correction information (gA, gτ). The calculation unit 30 generates the spatial information (distance L) based on the amount of the intended electric charges.

Note that, the formula used in the calculation unit 30 is not limited to the aforementioned formula (27). This formula may be appropriately modified in accordance with kinds and number of demodulation signals generated by the demodulation signal generation unit 33.

As mentioned above, the spatial information detection device includes the light projecting unit 11, the light receiving unit 12, the electric charge accumulator 123, the modulation signal generation unit 32, the demodulation signal generation unit 33, the calculation unit 30, and the correction information provision unit 34. The light projecting unit 11 is configured to emit light to the space (intended area) to be searched. The light receiving unit 12 is configured to receive light from the space and generate the amount of the electric charges corresponding to the amount of the received light. The electric charge accumulator 123 is configured to accumulate the electric charges generated by the light receiving unit 12 within the designated collection time period, over the predetermined accumulation time period longer than the collection time period. The modulation signal generation unit 32 is configured to generate the modulation signal to modulate the light output from the light projecting unit 11 with the modulation signal to emit the signal light. The modulation signal is a square wave signal which has the continuous periods for each of two signal values, a length of each continuous period being equal to an integral multiple of the unit time period and being varied randomly in the accumulation time period. The demodulation signal generation unit 33 is configured to generate the demodulation signal having a predetermined phase relative to the modulation signal and determine the collection time period by use of the demodulation signal. The calculation unit 30 is configured to calculate the spatial information relating to the space, from the amount of the electric charges accumulated by the electric charge accumulator 123. The correction information provision unit 34 is configured to, when the unintended object exists in an area between the space and the set of the light projecting unit 11 and the light receiving unit 12 and the light receiving unit 12 receives the light reflected by the unintended object, provide the correction information relating to the electric charges caused by the existence of the unintended object, thereby prompting the calculation unit 30 to calculate the spatial information by eliminating the effect caused by the amount of the electric charges generated due to the existence of the unintended object from the amount of the electric charges accumulated by the electric charge accumulator 123.

In other words, the spatial information detection device of the present embodiment includes the light projecting unit 11, the light receiving unit 12, the modulation signal generation unit 32, the demodulation signal generation unit 33, the calculation unit 30, and the correction information provision unit 34. The modulation signal generation unit 32 is configured to generate the modulation signal and provide the modulation signal to the light projecting unit 11. The modulation signal is defined as a square wave signal having high and low level periods appearing alternately, each of the high and low level periods having its length randomly selected from integral multiples of a predetermined unit time period. The light projecting unit 11 is configured to emit the signal light to the space including the predetermined intended area. The light projecting unit 11 is configured to, upon receiving the modulation signal, modulate light with the received modulation signal to generate the signal light. The demodulation signal generation unit 33 is configured to generate the demodulation signal and provide the demodulation signal to the light receiving unit 12. The demodulation signal is defined as a signal which has the same waveform as that of the modulation signal or that of a signal obtained by inversion of the modulation signal. The light receiving unit 12 is configured to receive light from the space. The light receiving unit 12 is configured to produce an amount of electric charges corresponding to an intensity of light received from the space within the collection time period defined by one of the first period in which the demodulation signal has the high level and the second period in which the demodulation signal has the low level. The light receiving unit 12 is configured to accumulate the electric charges produced within the collection time period over the predetermined accumulation time period longer than the collection time period to generate the signal electric charges. The correction information provision unit 34 is configured to generate the correction information regarding the electric charges which the light receiving unit 12 produces in response to light from the unintended area existing between the intended area and the set of the light projecting unit 11 and the light receiving unit 12. The calculation unit 30 is configured to generate the spatial information regarding the intended area. The calculation unit 30 is configured to correct the signal electric charges (the amount bA0, bA1, bA2, bA3 of the signal electric charges) with the correction information (gA, gτ), thereby calculating the amount (A0, A1, A2, A3) of the intended electric charges which the light receiving unit 12 produces in response to light from the intended area. The calculation unit 30 is configured to generate the spatial information (distance L) based on the amount (A0, A1, A2, A3) of the intended electric charges.

Further, in the spatial information detection device of the present embodiment, the correction information provision unit 34 includes the phase shift unit 341 and the correction information calculation unit 342. The phase shift unit 341 is configured to relatively change the phases of the modulation signal and the demodulation signal by an integral multiple of length shorter than the unit period (chip duration Tc). The correction information calculation unit 342 is configured to calculate the correction information relating to the unintended object by use of the relations between the phases varied by the phase shift unit 341 and the amounts of the electric charges accumulated by the electric charge accumulator 123 related to the respective varied phases.

In other words, the spatial information detection device of the present embodiment further includes the search signal generation unit (demodulation signal generation unit) 33. The search signal generation unit 33 is configured to generate the search signal and provide the search signal to the light receiving unit 12. The search signal is defined as a signal having a predetermined time difference relative to the modulation signal. The correction information provision unit 34 includes the phase shift unit 341 and the correction information calculation unit 342. The light receiving unit 12 is configured to produce the amount of the electric charges corresponding to the intensity of the light received from the space within the second collection time period defined by one of the first period in which the search signal has the high level and the second period in which the search signal has the low level. The light receiving unit 12 is configured to accumulate the electric charges produced within the second collection time period over the predetermined second accumulation time period longer than the second collection time period to generate the correction electric charges. The phase shift unit 341 is configured to vary the time difference (shift period td) by the variation width shorter than the unit time period (the chip duration Tc) within the predetermined time range (search range) in order to allow the search signal generation unit (demodulation signal generation unit) 33 to generate the plurality of search signals with different time differences (shift periods td). The correction information calculation unit 342 is configured to obtain the correction electric charges from the light receiving unit 12 with regard to each of the search signals with the different time differences (shift periods td), and generate the correction information based on the relation between the time difference (shift period td) and the amount of the correction electric charges.

Furthermore, in the spatial information detection device of the present embodiment, the correction information provision unit 34 includes the correction information storage unit 344 and the update judgment unit 345. The correction information storage unit 344 is configured to store the correction information. The update judgment unit 345 is configured to, when the predetermined update condition is fulfilled, give instructions to update the correction information stored in the correction information storage unit 344. In other words, the correction information provision unit 34 is configured to judge whether the predetermined update condition is fulfilled, and to, upon concluding that the update condition is fulfilled, update the correction information.

According to the spatial information detection device of the present embodiment mentioned above, even if the unintended object is present between the spatial information detection device and the space (intended area) to be searched for the spatial information, the spatial information is corrected by use of the correction information relating to the unintended object. Hence, the effect caused by the unintended object is eliminated. Consequently, the detection accuracy of the spatial information can be improved.

Especially, in the present embodiment, the correction information provision unit 34 calculates the component gA and the time difference gτ as the correction information. The component gA is defined as an amount of the unintended electric charges corresponding to the electric charges which the light receiving unit 12 produces in response to reception of light from the unintended area. The time difference gτ is defined as time (i.e., the flight time relating to the unintended object) starting from time when the light projecting unit 11 emits the signal light and ending on time when the light receiving unit 12 receives the light reflected by the unintended object (object causes light from the unintended area) present in the unintended area.

The correction information provision unit 34 calculates the component gA and the time difference gτ based on the relation between the shift period td and the amount gA0 of the correction electric charges.

The component gA is a product of the unit time period (Tc) and the change rate (=gA/Tc) of the amount gA0 of the electric charges to the shift period td in the range (−(Tc−gτ)≤td≤0) in which the amount gA0 of the correction electric charges is varied linearly with the shift period td. Hence, the correction information calculation unit 342 calculates the change rate (=gA/Tc) of the amount gA0 of the electric charges to the shift period td in the range (−(Tc−gτ)≤td≤0) in which the amount gA0 of the correction electric charges is varied linearly with the shift period td. The correction information calculation unit 342 calculates the product of the calculated change rate (gA/Tc) and the unit time period (Tc) as the component (amount of the unintended electric charges) gA.

The time difference g1 is defined as the shift period td at which the change rate of the amount gA0 of the correction electric charges to the shift period td becomes zero. Hence, the correction information provision unit 34 calculates, as the time difference gτ, the shift period td at which the change rate of the amount gA0 of the correction electric charges to the shift period td becomes zero.

The calculation unit 30 preliminarily stores a conversion formula (see the aforementioned formulae (15) to (20) and (25) to (27)) of the amount of the signal electric charges (bA0, bA1, bA2, bA3) to the amount of the intended electric charges (A0, A1, A2, A3) by use of the component gA and the time difference gτ. The calculation unit 30 corrects the amount of the signal electric charges as the amount of the intended electric charges by use of the component gA and the time difference gτ obtained from the correction information provision unit 34 and the conversion formula.

Note that, the correction information provision unit 34 may judge whether the unintended object (e.g., the transparent object 2) is present in the unintended area. When concluding the unintended object is absent, the correction information provision unit 34 does not calculate the correction information. In this case, the calculation unit 30 calculates the spatial information from the amount of the signal electric charges. Meanwhile, when concluding the unintended object is present, the correction information provision unit 34 calculates the correction information. In this case, the calculation unit 30 corrects the amount of the signal electric charges as the amount of the intended electric charges by use of the correction information, and calculates the spatial information from the amount of the intended electric charges.

A mentioned above, in the spatial information detection device of the present embodiment, the spatial information is defined as the distance (L) to the intended object (object) 1 present in the intended area. The calculation unit 30 is configured to calculate, from the amount of the intended electric charges (e.g., the amount A0, A1, A2, A3 of the electric charges), the flight time τ starting from time when the light projecting unit 11 emits the signal light and ending on time when the light receiving unit 12 receives the light reflected by the intended object (object) 1. The calculation unit 30 is configured to determine the distance L based on the calculated flight time τ.

The correction information includes the unintended component gA and the unintended flight time gτ. The unintended component gA is defined as an amount of unintended electric charges corresponding to electric charges which the light receiving unit 12 produces in response to light from the unintended area. The unintended flight time gτ is defined as time starting from time when the light projecting unit 11 emits the signal light and ending on time when the light receiving unit 12 receives the light reflected by an unintended object present in the unintended area. The correction information calculation unit 342 is configured to calculate the change rate of the amount gA0 of the correction electric charges to the time difference (shift period) td. The correction information calculation unit 342 is configured to calculate, as the unintended component, the product of the unit time period (Tc) and the change rate (gA/Tc) within the range in which the amount gA0 of the correction electric charges changes linearly with time difference (shift period) td. The correction information calculation unit 342 is configured to select, as the unintended flight time $g\tau$, the time difference (shift period) td at which the change rate becomes 0. The calculation unit 30 is configured to preliminarily store the conversion formula (e.g., (15) to (20) and (25) to (27)) of the amount of the signal electric charges (bA0, bA1, bA2, bA3) to the amount of the intended electric charges (A0, A1, A2, A3) by use of the unintended component gA and the unintended flight time $g\tau$. The calculation unit 30 is configured to correct the amount of the signal electric charges as the amount of the intended electric charges by use of the unintended component gA and the unintended flight time $g\tau$ obtained from the correction information provision unit 34 and the conversion formula.

Note that, in the spatial information detection device of the present embodiment, the calculation unit 30 stores the conversion formula (e.g., the aforementioned formula (27)) for directly calculating the flight time $\tau$ from the unintended component gA, the unintended flight time $g\tau$, and the amount of the signal electric charges (bA0, bA1, bA2, bA3).

Moreover, in the spatial information detection device of the present embodiment, the demodulation signal generation unit 33 is configured to generate the plurality of demodulation signals. The plurality of demodulation signals include two of the first demodulation signal having the same waveform as that of the modulation signal, the second demodulation signal defined as a signal obtained by inversion of the first demodulation signal, the third demodulation signal delayed from the first demodulation signal by the unit time period (the chip duration Tc), and the fourth demodulation signal defined as a signal obtained by inversion of the third demodulation signal.

As described above, in the spatial information detection device of the present embodiment, the demodulation signal generation unit 33 generates the two types of the demodulation signals from the first demodulation signal having the same relation between the two values as that of the modulation signal, the second demodulation signal obtained by interchanging the two values of the first demodulation signal, the third demodulation signal delayed from the modulation signal by the unit time period, and the fourth demodulation signal obtained by interchanging the two values of the third demodulation signal. The calculation unit 30 applies the correction information to the amounts of the electric charges which are generated within the collection time periods designated by the respective demodulation signals generated by the demodulation signal generation unit 33 and accumulated over the accumulation time periods, thereby calculating the time difference (flight time $\tau$) between the time of emitting light and the time of receiving light, and calculates as the spatial information the distance L to the object present in the space by use of the calculated time difference (flight time $\tau$).

(Second Embodiment)

In the first embodiment, the explanation is made to the technique of calculating the correction information gA and $g\tau$ with regard to the range in which only the transparent object 2 exists. In a process of calculating the correction information gA and $g\tau$, it may be difficult to make a situation where only the transparent object 2 exists. The following explanation is made to a technique of acquiring the correction information gA and $g\tau$ relating to the transparent object 2 by use of the fact that the distance from the distance measurement device to the transparent object 2 is shorter than the distance from the distance measurement device to the space selected as the target for distance measurement.

Figure 9:
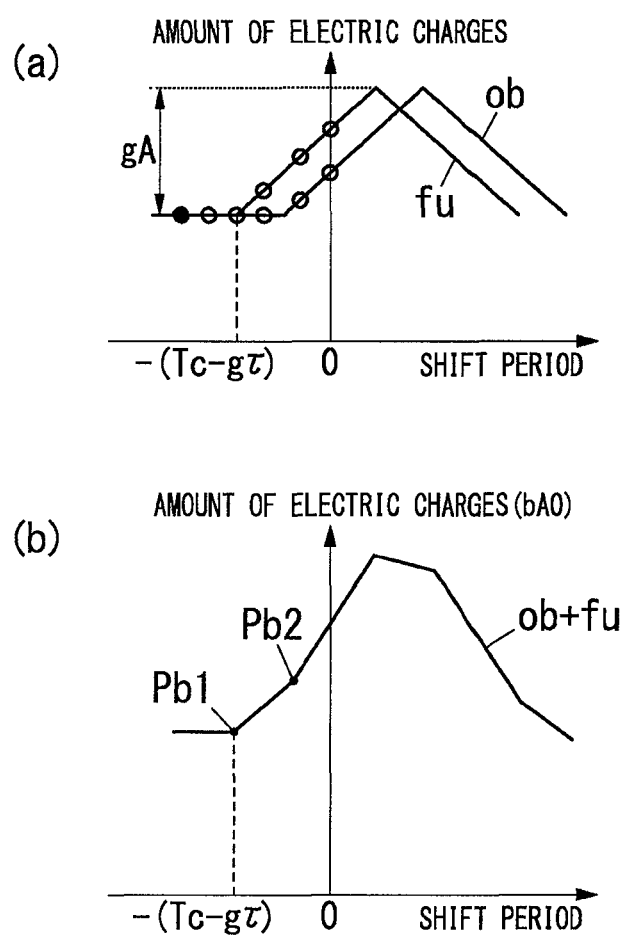
FIG. 9 is an explanatory diagram illustrating an operation of the spatial information detection device of the above first embodiment.

When the transparent object 2 is closer than the object 1 is, the amount A0 of the electric charges related to the light reflected by the object 1 and the amount gA0 of the electric charges related to the light reflected by the transparent object 2 are varied with a change in the shift period td, as shown in FIG. 9 (*a*). In this figure, line "ob" denotes the amount of the electric charges relating to the object 1, and line "fn" denotes the amount of the electric charges relating to the transparent object 2. According to a comparison between ranges in which the amount of the electric charges is varied with a change in the shift period td, the range (effective range) corresponding to the amount A0 of the electric charges related to the light reflected by the object 1 is narrower than the range corresponding to the amount gA0 of the electric charges related to the light reflected by the transparent object 2.

Note that, to simplify the explanation, in FIG. 9 (*a*), the maximum of the component of the signal light and the component of the environmental light related to the amount A0 of the electric charges are considered to be same as the maximum of the component of the signal light and the component of the environmental light related to the amount gA0 of the electric charges, respectively, but actually these are different. However, desired information is a boundary point between a region in which the amount of the electric charges is varied with a change in the shift period td and a region in which the amount of the electric charges is constant irrespective of a change in the shift period td. Therefore, there is no need to consider magnitudes of the components particularly.

Since the reflection light detected by the distance measurement device is the total of the reflection light from the object 1 and the reflection light from the transparent object 2, as shown in FIG. 9 (*b*), the amount bA0 of the electric charges actually measured includes a plurality of critical points Pb1, Pb2, . . . with regard to the variation in the shift period td. The distance from the distance measurement device to the transparent object 1 is shorter than that from the distance measurement device to the object 1. Hence, it is presumable that the boundary point Pb1 between the region in which the amount bA0 of the electric charges is constant irrespective of a change in the shift period td and the region in which the amount bA0 of the electric charges is varied with a change in the shift period td is due to the transparent object 2. Thus, in FIG. 9 (*b*), a region between the first critical point Pb1 and the second critical point Pb2 from the left is considered as showing a variation in the amount gA0 of the received light corresponding to only the reflection light from the transparent object 2.

With using the idea, the correction information gA and $g\tau$ with regard to the transparent object 2 can be calculated through the following procedure. First, after the variation in the amount bA0 of the electric charges with the variation in the shift period td is obtained, the shift period corresponding to the boundary point at which the amount bA0 of the electric charges becomes constant irrespective of the variation in the shift period td is obtained. This boundary point is treated as the first critical point Pb1. Next, with regard to a region in which the shift period is shorter than that at the boundary point, the change rate of the amount bA0 of the electric charges to the shift period td is obtained, and further a point at which the change rate is varied by a prescribed value or more is obtained. This point is treated as the second critical point Pb2.

If the two critical points Pb1 and Pb2 are obtained in this manner, the change rate in the region between the two critical points Phi and Pb2 can be treated as the change rate of the amount gA0 of the electric charges obtained by only the light reflected by the transparent object 2. Hence, with determining, in view of this region, the range within which the shift period td is allowed to be varied, it is possible to obtain information necessary to calculate the correction information gA and gτ with regard to the transparent object 2. In other words, with providing the shift periods td corresponding to the respective critical points Pb1 and Pb2 to the range setting unit 343, the variation range of the shift period td necessary to calculate the correction information gA and gτ is automatically determined.

Figure 10:
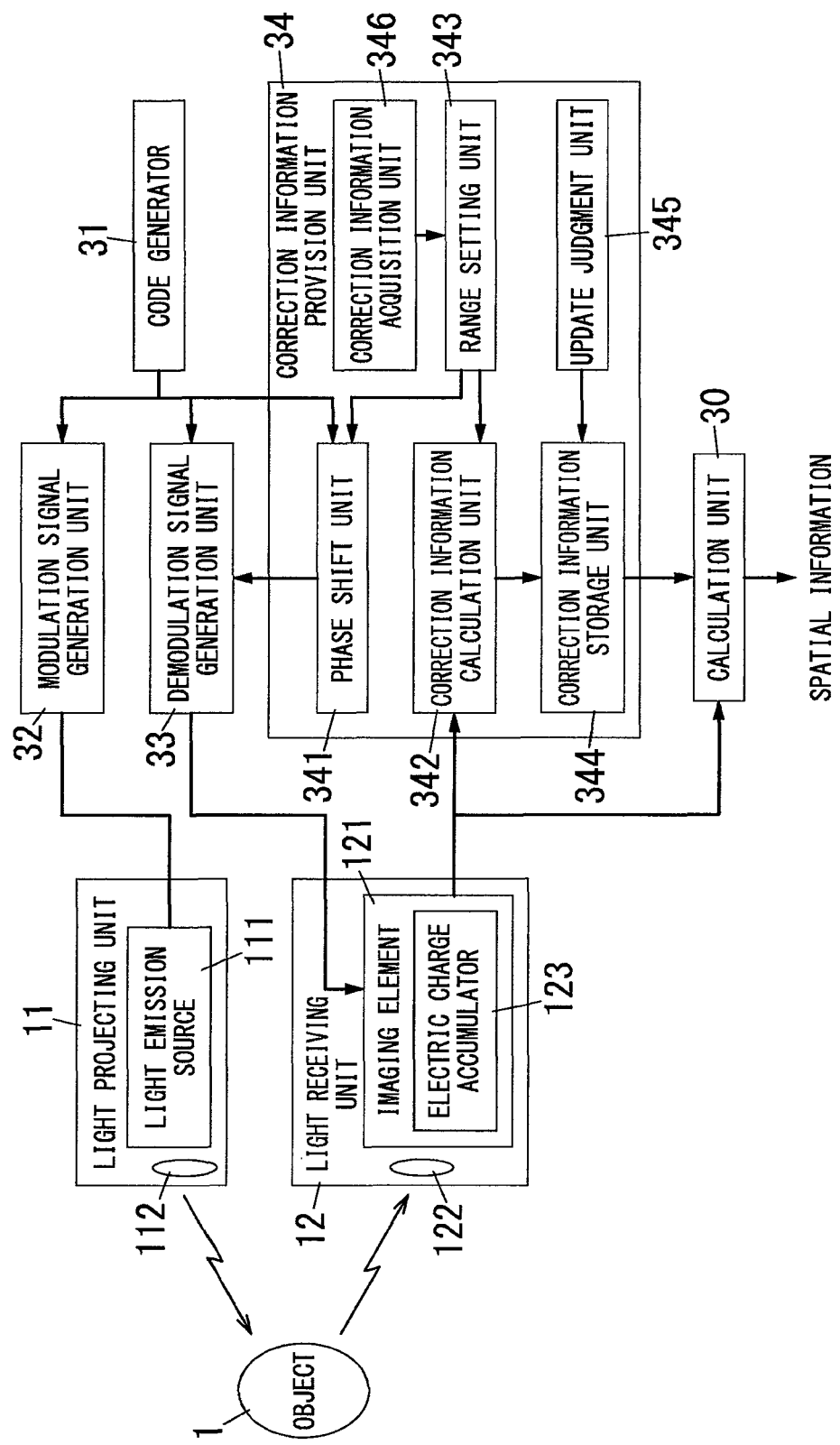
FIG. 10 is a block diagram illustrating the spatial information detection device of the second embodiment.

In the present embodiment, as mentioned above, the range of the shift period td necessary to calculate the correction information gA and gτ is automatically determined. For this purpose, as shown in FIG. 10, a correction information acquisition unit 346 is added to the correction information provision unit 34 shown in FIG. 1. The correction information acquisition unit 346 has a search mode of automatically determining the critical points Pb1 and Pb2, and a setting mode of automatically determining, from the critical points Pb1 and Pb2 determined in the search mode, the range within which the shift period td is allowed to be varied.

In the search mode, the correction information acquisition unit 346 determines the aforementioned critical points Pb1 and Pb2 through a process of selecting the different phases for the phase shift unit 341.

For example, the correction information acquisition unit 346 determines the shift period td corresponding to the boundary point at which the amount bA0 of the electric charges becomes constant irrespective of the variation in the shift period td, based on the relation between the time difference (shift period td) and the amount of the correction electric charges (bA0). The boundary point is defined as a point at which the change rate of the amount bA0 of the electric charges to the shift period td becomes 0. For example, the correction information acquisition unit 346 calculates the change rate of the amount of the correction electric charges to the time difference (shift period td). The correction information acquisition unit 346 detects the boundary point based on the relation between the change rate (gA/td) and the time difference (td). For example, the boundary point is the critical point Pb1 shown in FIG. 9 (*b*). The critical point Pb1 defines a lower limit of the effective range.

The correction information acquisition unit 346 determines a variation point at which the change rate of the amount bA0 of the electric charges to the shift period td is varied by a prescribed value or more, with regard to a range in which the shift period td is greater than the shift period td corresponding to the boundary point. For example, the variation point is defined by the critical point Pb2 shown in FIG. 9 (*b*). The critical point Pb2 defines an upper limit of the effective range. For example the prescribed value is determined such that the change rate is considered to be constant (the slope is considered to be constant) within the effective range when the change rate is less than the prescribed value.

In this manner, the correction information acquisition unit 36 determines the range defined by the two critical points Pb1 and Pb2.

Additionally, in the setting mode, information automatically determined based on the shift periods td (phases) corresponding to the respective critical points Pb1 and Pb2 determined by the search mode is given to the range setting unit 343. The information given to the range setting unit 343 is same as that given to the range setting unit 343 manually. Owing to this operation, the range setting unit 343 varies the shift period td within the range necessary to calculate the correction information gA and gτ and calculates the correction information gA and gτ.

Further, in the spatial information detection device of the present embodiment, the correction information provision unit 34 includes the range setting unit 343 configured to limit the range (search range) within which the phase shift unit 341 varies the phase to a range in which the phase is less than the phase (shift period td) corresponding to the boundary point (critical point Pb2) between the range (the range on the right side of the critical point Pb2 in FIG. 9 (*b*)) in which the electric charges accumulated in the electric charge accumulator 123 include the electric charges produced in response to light from the space and the range (the range on the left side of the critical point Pb2 in FIG. 9 (*b*)) in which the electric charges accumulated in the electric charge accumulator 123 include no electric charge produced in response to light from the space and select the limited range.

In other words, the correction information provision unit 34 includes the range setting unit 343 configured to designate the effective range of the time difference (shift period td) within which the correction electric charges which do not contain the intended electric charges (A0, A1, A2, A4) from the light receiving unit 12 are obtained. The correction information calculation unit 342 is configured to generate the correction information based on a relation between the time difference (shift period td) within the effective range designated by the range setting unit 343 and the amount of the correction electric charges (gA0, gA1, gA2, gA3).

Furthermore, in the present embodiment, the range setting unit 343 prompts the phase shift unit 341 to vary the phase (shift period td) with time. The range setting unit 343 automatically determines the range (effective range) of the phase within which the electric charges are caused by the reflection on only the unintended object, by use of the relation between the varied phase and the amount of the light received by the light receiving unit 12 related to the varied phase.

In other words, the correction information provision unit 34 includes the correction information acquisition unit 346 configured to decide the effective range based on the relation between the time difference (shift period td) within the predetermined time range (search range) and the amount of the correction electric charges (gA0, gA1, gA2, gA3). The range setting unit 343 is configured to designate the effective range decided by the correction information acquisition unit 346.

To calculate the correction information gA and gτ relating to the transparent object 2, one kind of the amounts of the electric charges is used (in the above instance, the amount of the electric charges associated with the collection time period designated by the first demodulation signal). Hence, a difference between the minimum and maximum of the amount of the electric charges is equal to the amount gA of the electric charges. Further, the amount gA of the electric charges is related to the reflection light from the transparent object 2. Therefore, a change in the amount gA of the electric charges with a change in the shift period td is relatively small. Meanwhile, the amount A0 of the electric charges associated with the collection time period designated by the first demodulation signal the amount A2 of the electric charges associated with the collection time period designated by the third demodulation signal are symmetrically related to each other. With regard to the relation between these amounts, when one of these amounts is increased with a change in the shift period td, the other is decreased. Therefore, with using the difference (gA0−gA2) between these amounts gA0 and gA2 of the electric charges, a change (gA0−gA2) in the amount of the electric charges with a change in the shift period td is doubled.

In view of this, it is preferable that the correction information provision unit 34 use the amount (gA0−gA2) of the electric charges as an alternative to the amount gA0 of the electric charges to calculate the component gA of the signal light reflected by the transparent object 2 (the amount of the unintended electric charges corresponding to the electric charges produced by the light receiving unit 12 in response to the light from the unintended area) and the time difference gτ as the correction information gA and gτ. With calculating the correction information gA and gτ from the amount (gA0−gA2) of the electric charges, it is possible to improve the accuracy of the correction information gA and gτ in comparison with a case where the correction information gA and gτ is calculated from the amount gA0 of the electric charges.

(Third Embodiment)

In the aforementioned embodiments, the operation of the distance measurement device under the existence of the transparent object 2 is described. However, also in the intensity measurement device, with using the correction information gA and gτ, it is possible to eliminate the electric charges caused by the existence of the transparent object 2 and calculate the spatial information. Hence, the spatial information detection device of the present embodiment serves as the intensity measurement device.

For example, when the transparent object 2 is absent, the following formula (28) is available in the light projection period to the object 1 which is present in the region determined by the range in which the time difference τ is equal to 0 or more and is equal to Tc or less. Note that, the suffix "L" is attached to denote the amount of the electric charges relates to the light projection period, and the suffix "D" is attached to denote the amount of the electric charges relates to the non-light projection period.

[FORMULA 16]

$$A0L = -\frac{A}{Tc}(\tau - Tc) + B \qquad (28)$$

To simplify the following explanation, it is assumed that the ratio in length of the light projection period to the non-light projection period is 1:1. On this assumption, the amount A0 (A0D) of the received light in the non-light projection period satisfies an equation of A0 (A0D)=B. In other words, the value of the reflection intensity is equal to a difference (A0L−A0D) between the amounts of the electric charges respectively related to the light projection period and the non-light projection period, and is expressed by the following formula (29).

[FORMULA 17]

$$A0L - A0D = \frac{A}{Tc}(Tc - \tau) \qquad (29)$$

In contrast, when the transparent object 2 exists, the amount bA0 (bA0L) of the received light in the light projection period is expressed by the following formula (30).

[FORMULA 18]

$$bA0L = A0L + gA0L = A0 - \frac{gA}{Tc}(g\tau - Tc) + gB \qquad (30)$$

Further, the amount bA0 (bA0D) of the received light in the non-projection period satisfies an equation of bA0D=B+gB.

Consequently, the value of the reflection intensity is equal to a difference ΔbA0 (=bA0L−bA0D) between the amounts of the electric charges respectively related to the light projection period and the non-light projection period, and is expressed by the following formula (31).

[FORMULA 19]

$$\Delta bA0 = \frac{A}{Tc}(Tc - \tau) + \frac{gA}{Tc}(Tc - g\tau) \qquad (31)$$

Similarly, when the value of the reflection intensity ΔbA1 (=bA1L−bA1D) with regard to the amount bA1 of the received light, this value of the reflection intensity is expressed by the following formula (32).

[FORMULA 20]

$$\Delta bA1 = \frac{A}{Tc}\tau + \frac{gA}{Tc}g\tau \qquad (32)$$

Hence, the following formula (33) is obtained.

[FORMULA 21]

$$\Delta bA0 + \Delta bA1 = \frac{A}{Tc}Tc + \frac{gA}{Tc}Tc = A + gA \qquad (33)$$

With regard to the above formula, since the correction information gA is known, the component A of the signal light (i.e., the value of the reflection intensity) can be calculated by use of the amounts bA0 and bA1 of the electric charges. Note that, similar calculation can be performed by use of a combination of any one of the amounts bA0 and bA2 of the electric charges and any one of the amounts bA1 and bA3 of the electric charges.

In summary, in the present embodiment, the correction information provision unit 34 calculates as the correction information the amount gA of the electric charges caused by the light from the unintended area (the reflection light from the unintended object).

The demodulation signal generation unit 33 generates the two demodulation signals (hereinafter, referred to as "first timing signal" and "second timing signal") with different time differences relative to the modulation signal and provides these generated demodulation signals to the light receiving unit 12.

The calculation unit 30 acquires the amount of the electric charges (first amount of the electric charges, for example, bA0L) related to the first timing signal in the light projection period and the amount of the electric charges (second amount of the electric charges, for example, bA0D) related to the first timing signal in the non-light projection period, and calculates a difference (first difference, for example, bA0L−bA0D) between the first amount of the electric charges and the second amount of the electric charges.

Additionally, the calculation unit 30 acquires the amount of the electric charges (third amount of the electric charges, for example, bA1L) related to the second timing signal in the light projection period and the amount of the electric charges (fourth amount of the electric charges, for example, bA1D) related to the fourth timing signal in the non-light projection period, and calculates a difference (second difference, for example, bA1L−bA1D) between the third amount of the electric charges and the fourth amount of the electric charges.

The calculation unit 30 subtracts the correction information (gA) from the sum of the first difference and the second difference to acquire the value of the reflection intensity (A). As described above, the calculation unit 30 calculates the reflection intensity (value of the reflection intensity A) based on a difference between the amount of the intended electric charges associated with the light projection period and the amount of the intended electric charges associated with the non-light projection period.

As mentioned above, in the spatial information detection device of the present embodiment, the spatial information is defined as the reflection intensity of the signal light in the intended area.

The correction information includes the unintended component gA. The unintended component gA is defined as the amount of the unintended electric charges corresponding to the electric charges which the light receiving unit 12 produces in response to light from the unintended area. The correction information calculation unit 342 is configured to calculate the change rate of the amount gA0 of the correction electric charges to the time difference (shift period) td. The correction information calculation unit 342 is configured to calculate, as the unintended component gA, a product of the unit time period (Tc) and the change rate (gA/Tc) within a range in which the amount gA0 of the correction electric charges changes linearly with the time difference (shift period) td. The calculation unit 30 is configured to preliminarily store the conversion formula (e.g., the aforementioned formula (33)) of the amount of the signal electric charges (bA0, bA1, bA2, bA3) to the amount of the intended electric charges (A0, A1, A2, A3) by use of the unintended component gA. The calculation unit 30 is configured to correct the amount of the signal electric charges as the amount of the intended electric charges by use of the unintended component gA obtained from the correction information provision unit 34 and the conversion formula.

Further, in the spatial information detection device of the present embodiment, the light projecting unit 11 is configured to emit the signal light within the light projection period and not emit the signal light within the non-light projection period. The calculation unit 30 is configured to calculate the reflection intensity based on the amount of the intended electric charges associated with the light projection period and the amount of the intended electric charges associated with the non-light projection period.

As described above, the spatial information detection device of the present embodiment serves as the intensity measurement device. In this regard, the modulation signal generation unit 32 provides the light projection period in which the light projecting unit 11 emits the signal light to the space and the non-light projection period in which the light projecting unit 11 does not emit the signal light to the space. The calculation unit 30 eliminates the amount of the electric charges relating to the environmental light received by the light receiving unit 12 within the non-light projection period, from the amount of the electric charges relating to light received by the light receiving unit 12 within the light projection period, by use of the amount of the electric charges (signal electric charges) accumulated by the electric charge accumulator 123 within the light projection period and the amount of the electric charges (signal electric charges) accumulated by the electric charge accumulator 123 within the non-light projection period, and uses the correction information in combination with the resultant amount of the electric charges, thereby calculating the reflection intensity of the signal light as the spatial information.

Alternatively, the value of the reflection intensity can be calculated by use of two kinds of the differences (bA0−bA2) and (bA1−bA3) between the amounts of the electric charges. In brief, the following formulae (34) and (35) are available.

[FORMULA 22]

$$bA0 - bA2 = A0 - A2 - 2\frac{gA}{Tc}(g\tau - Tc) \quad (34)$$

$$bA1 - bA3 = A1 - A3 + 2\frac{gA}{Tc}g\tau \quad (35)$$

The following formula (36) is derived from the sum of these formulae.

[FORMULA 23]

$$bA0+bA1-bA2-bA3=A0+A1-A2-A3+2gA=2(A+gA) \quad (36)$$

Hence, the value of the reflection intensity (A) is expressed by the following formula (37).

[FORMULA 24]

$$A = \frac{bA0 + bA1 - bA2 - bA3}{2} - gA \quad (37)$$

As mentioned above, in this modification, the demodulation signal generation unit 33 generates the first demodulation signal, the second demodulation signal, the third demodulation signal, and the fourth demodulation signal as described above. The calculation unit 30 inputs the amount bA0 of the electric charges associated with the first demodulation signal, the amount bA1 of the electric charges associated with the second demodulation signal, the amount bA2 of the electric charges associated with the third demodulation signal, the amount bA3 of the electric charges associated with the fourth demodulation signal, and the correction information (gA) to the aforementioned formula (37) to calculate the value of the reflection intensity (A).

With using the relation expressed by the aforementioned formula (37), it is possible to modify, with the correction information gA, the amounts bA0, bA1, bA2, and bA3 of the electric charges suffering from the reflection on the transparent object 2 and calculate the component A of the signal light (i.e., the value of the reflection intensity). Hence, with performing calculation using the aforementioned formula (37) by the calculation unit 30, the effect caused by the transparent object 2 on the value of the reflection intensity can be eliminated.

The invention claimed is:

1. A spatial information detection device comprising:
a light projecting unit configured to emit signal light to a space including a predetermined intended area;
a light receiving unit configured to receive light from the space;
a modulation signal generation unit configured to generate a modulation signal and provide the modulation signal to the light projecting unit;
a demodulation signal generation unit configured to generate a demodulation signal and provide the demodulation signal to the light receiving unit;
a calculation unit configured to generate spatial information regarding the intended area; and
a correction information provision unit, wherein:
the modulation signal is defined as a square wave signal having high and low level periods appearing alternately, each of the high and low level periods having its length randomly selected from integral multiples of a predetermined unit time period;
the light projecting unit is configured to, upon receiving the modulation signal, modulate light with the received modulation signal to generate the signal light;
the demodulation signal is defined as a signal which has the same waveform as that of the modulation signal or that of a signal obtained by inversion of the modulation signal;
the light receiving unit is configured to produce an amount of electric charges corresponding to an intensity of light received from the space within a collection time period defined by one of a first period in which the demodulation signal has a high level and a second period in which the demodulation signal has a low level, and accumulate the electric charges produced within the collection time period over a predetermined accumulation time period longer than the collection time period to generate signal electric charges;
the correction information provision unit is configured to generate correction information regarding electric charges which the light receiving unit produces in response to light from an unintended area existing between the intended area and a set of the light projecting unit and the light receiving unit; and
the calculation unit is configured to correct by use of the correction information the amount of the signal electric charges as an amount of intended electric charges corresponding to the electric charges which the light receiving unit produces in response to light from the intended area, and generate the spatial information based on the amount of the intended electric charges.

2. The spatial information detection device as set forth in claim 1, wherein:
the spatial information detection device further comprises a search signal generation unit configured to generate a search signal and provide the search signal to the light receiving unit;
the search signal is defined as a signal having a predetermined time difference relative to the modulation signal;
the correction information provision unit includes a phase shift unit and a correction information calculation unit;
the light receiving unit is configured to produce an amount of electric charges corresponding to an intensity of light received from the space within a second collection time period defined by one of a first period in which the search signal has a high level and a second period in which the search signal has a low level, and accumulate the electric charges produced within the second collection time period over a predetermined second accumulation time period longer than the second collection time period to generate correction electric charges;
the phase shift unit is configured to vary the time difference by a variation width shorter than the unit time period within a predetermined time range in order to allow the search signal generation unit to generate the plurality of search signals with different time differences; and
the correction information calculation unit is configured to obtain the correction electric charges from the light receiving unit with regard to each of the search signals with the different time differences, and generate the correction information based on a relation between the time difference and an amount of the correction electric charges.

3. The spatial information detection device as set forth in claim 2, wherein:
the spatial information is defined as a distance to an intended object present in the intended area;
the calculation unit is configured to calculate, from the amount of the intended electric charges, flight time starting from time when the light projecting unit emits the signal light and ending on time when the light receiving unit receives the light reflected by the intended object, and determine the distance based on the calculated flight time;
the correction information includes an unintended component and unintended flight time;
the unintended component is defined as an amount of unintended electric charges corresponding to electric charges which the light receiving unit produces in response to light from the unintended area;
the unintended flight time is defined as time starting from time when the light projecting unit emits the signal light and ending on time when the light receiving unit receives the light reflected by an unintended object present in the unintended area;
the correction information calculation unit is configured to calculate a change rate of the amount of the correction electric charges to the time difference;
the correction information calculation unit is configured to calculate, as the unintended component, a product of the unit time period and the change rate within a range in which the amount of the correction electric charges changes linearly with time difference;
the correction information calculation unit is configured to select, as the unintended flight time, the time difference at which the change rate becomes 0;
the calculation unit is configured to preliminarily store a conversion formula of the amount of the signal electric charges to the amount of the intended electric charges by use of the unintended component and the unintended flight time; and
the calculation unit is configured to correct the amount of the signal electric charges as the amount of the intended electric charges by use of the unintended component and the unintended flight time obtained from the correction information provision unit and the conversion formula.

4. The spatial information detection device as set forth in claim 3, wherein:
the demodulation signal generation unit is configured to generate the plurality of demodulation signals; and
the plurality of demodulation signals include two of a first demodulation signal having the same waveform as that of the modulation signal, a second demodulation signal defined as a signal obtained by inversion of the first demodulation signal, a third demodulation signal delayed from the first demodulation signal by the unit time period, and a fourth demodulation signal defined as a signal obtained by inversion of the third demodulation signal.

5. The spatial information detection device as set forth in claim 2, wherein:
the spatial information is defined as a reflection intensity of the signal light in the intended area;
the correction information includes an unintended component;
the unintended component is defined as an amount of unintended electric charges corresponding to electric charges which the light receiving unit produces in response to light from the unintended area;

the correction information calculation unit is configured to calculate a change rate of the amount of the correction electric charges to the time difference;

the correction information calculation unit is configured to calculate, as the unintended component, a product of the unit time period and the change rate within a range in which the amount of the correction electric charges changes linearly with the time difference;

the calculation unit is configured to preliminarily store a conversion formula of the amount of the signal electric charges to the amount of the intended electric charges by use of the unintended component; and the calculation unit is configured to correct the amount of the signal electric charges as the amount of the intended electric charges by use of the unintended component obtained from the correction information provision unit and the conversion formula.

6. The spatial information detection device as set forth in claim 5, wherein:

the light projecting unit is configured to emit the signal light within a light projection period and not emit the signal light within a non-light projection period; and the calculation unit is configured to calculate the reflection intensity based on the amount of the intended electric charges associated with the light projection period and the amount of the intended electric charges associated with the non-light projection period.

7. The spatial information detection device as set forth in claim 2, wherein:

the correction information provision unit includes a range setting unit configured to designate an effective range of the time difference within which the correction electric charges which do not contain the intended electric charges from the light receiving unit are obtained; and the correction information calculation unit is configured to generate the correction information based on a relation between the time difference within the effective range designated by the range setting unit and the amount of the correction electric charges.

8. The spatial information detection device as set forth in claim 7, wherein:

the correction information provision unit includes a correction information acquisition unit configured to decide the effective range based on the relation between the time difference within the predetermined time range and the amount of the correction electric charges; and the range setting unit is configured to designate the effective range decided by the correction information acquisition unit.

9. A spatial information detection device comprising:

a light projecting unit configured to emit signal light to a space including a predetermined intended area;

a light receiving unit configured to receive light from the space;

a modulation signal generation unit configured to generate a modulation signal and provide the modulation signal to the light projecting unit;

a demodulation signal generation unit configured to generate a demodulation signal and provide the demodulation signal to the light receiving unit;

a calculation unit configured to generate spatial information regarding the intended area; and a correction information provision unit, wherein:

the modulation signal is defined as a square wave signal having high and low level periods appearing alternately, each of the high and low level periods having its length randomly selected from integral multiples of a predetermined unit time period;

the light projecting unit is configured to, upon receiving the modulation signal, modulate light with the received modulation signal to generate the signal light;

the demodulation signal is defined as a signal which has the same waveform as that of the modulation signal or that of a signal obtained by inversion of the modulation signal;

the light receiving unit is configured to produce an amount of electric charges corresponding to an intensity of light received from the space within a collection time period defined by one of a first period in which the demodulation signal has a high level and a second period in which the demodulation signal has a low level, and accumulate the electric charges produced within the collection time period over a predetermined accumulation time period longer than the collection time period to generate signal electric charges;

the correction information provision unit is configured to generate correction information regarding electric charges which the light receiving unit produces in response to light from an unintended area existing between the intended area and a set of the light projecting unit and the light receiving unit; and the calculation unit is configured to correct by use of the correction information the amount of the signal electric charges as an amount of intended electric charges corresponding to the electric charges which the light receiving unit produces in response to light from the intended area, and generate the spatial information based on the amount of the intended electric charges, wherein the correction information provision unit is configured to judge whether a predetermined update condition is fulfilled, and to, upon concluding that the update condition is fulfilled, update the correction information.

* * * * *